United States Patent
In et al.

(10) Patent No.: US 7,516,295 B2
(45) Date of Patent: Apr. 7, 2009

(54) METHOD OF REMAPPING FLASH MEMORY

(75) Inventors: Ji-hyun In, Seongnam-si (KR); Hyo-jun Kim, Seoul (KR); Kwang-yoon Lee, Seongnam-si (KR); Tae-sun Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 11/050,737

(22) Filed: Feb. 7, 2005

(65) Prior Publication Data
US 2005/0174849 A1 Aug. 11, 2005

(30) Foreign Application Priority Data
Feb. 6, 2004 (KR) .................. 10-2004-0008068

(51) Int. Cl.
*G06F 12/00* (2006.01)
(52) U.S. Cl. .................. 711/202; 711/103; 711/158
(58) Field of Classification Search ............... 711/103, 711/202
See application file for complete search history.

(56) References Cited

U.S. PATENT DOCUMENTS

| 5,473,765 | A | * | 12/1995 | Gibbons et al. ............... 703/24 |
| 5,737,742 | A | * | 4/1998 | Achiwa et al. ............... 711/103 |
| 5,963,474 | A | | 10/1999 | Uno et al. |
| 6,016,275 | A | | 1/2000 | Han |
| 6,381,176 | B1 | * | 4/2002 | Kim et al. ............... 365/185.11 |
| 6,621,746 | B1 | * | 9/2003 | Aasheim et al. ........ 365/185.29 |
| 6,763,424 | B2 | * | 7/2004 | Conley ...................... 711/103 |
| 7,155,584 | B2 | * | 12/2006 | Beckert et al. ............... 711/103 |

FOREIGN PATENT DOCUMENTS

| EP | 1 209 570 A2 | 5/2002 |
| JP | 2002-366420 A | 12/2002 |
| KR | 2002-0092261 A | 12/2002 |

* cited by examiner

*Primary Examiner*—Kevin L Ellis
*Assistant Examiner*—Alan M Otto
(74) *Attorney, Agent, or Firm*—Sughrue Mion, PLLC

(57) ABSTRACT

A method of re-mapping a flash memory, which minimizes the number of times the flash memory, is accessed and helps to evenly use the entire area of the flash memory, is provided. The method includes arranging a plurality of physical units yet to be mapped according to their erase count values, and sequentially mapping the physical units to a logic unit in such a manner that a physical unit having a smaller erase count value is mapped to the logic unit ahead of a physical unit having a larger erase count value.

26 Claims, 23 Drawing Sheets

FIG. 1A (Related Art)

| LBN | LUN |
|---|---|
| 1 | 1 |
| 2 | 1 |
| 3 | 2 |
| 4 | 2 |
| 5 | 2 |
| 6 | 1 |
| ... | ... |

FIG. 1B (Related Art)

| LUN | PUN |
|---|---|
| 1 | 1 |
| 2 | 1 |
| ... | ... |

METHOD OF REMAPPING FLASH MEMORY

CROSS-REFERENCE TO RELATED APPLICATION

This application claims priority from Korean Patent Application No. 10-2004-0008068 filed on Feb. 6, 2004, in the Korean Intellectual Property Office, the disclosure of which is incorporated herein by reference in its entirety.

BACKGROUND OF THE INVENTION

1. Field of the Invention

The present invention relates to a method of re-mapping a flash memory, and more particularly, to a method of re-mapping a flash memory, which can minimize the number of times the flash memory is accessed and can enable the entire area of the flash memory to be evenly used.

2. Description of the Related Art

In general, home appliances, communications devices, and embedded systems, such as set-top boxes, use non-volatile memories such as storage devices for storing and processing data.

Flash memories are one type of non-volatile memory, in which data can be electrically erased and overwritten. Flash memories are suitable for portable devices because they consume less power than magnetic disc memory-based storage mediums, are as accessible as hard discs, and are compact-sized.

Due to the hardware characteristics of flash memories, data recorded on a flash memory is erased in units of blocks, unlike in the conventional random access memory (RAM), nonvolatile storage medium or magnetic storage medium.

In other words, in the flash memories, data is recorded on a sector as a logical operation unit of a host while data recorded on the sector is erased by deleting the overall blocks containing the sector.

Since a unit in which data is recorded on a flash memory is different from a unit in which data is erased from the flash memory, the performance of the flash memory may deteriorate.

In order to prevent the performance of the flash memory from deteriorating for this reason, logical addresses and physical addresses have been suggested.

In other words, to perform data reading or writing operations, predetermined logical addresses are changed into physical addresses of the flash memory through various types of algorithms. In this case, the performance of the flash memory can be maximized by performing mapping in consideration of physical conditions of the flash memory.

A flash translation layer is software that helps the use of the flash memory as a block device, and generally supports a re-mapping method for efficiently managing the flash memory.

Here, the re-mapping method enables management of mapping information on the relationships between logical block numbers (LBNs) and physical block numbers (PBNs) of given data. By doing so, data recorded in the flash memory is always accessible with the same logical block number (LBN) even though a pertinent PBN changes.

In other words, referring to FIGS. 1A and 1B, when a request for reading or writing data using a predetermined logic block number (LBN) is issued, the predetermined LBN is mapped to a logical unit number (LUN) with reference to an LBN-to-LUN mapping table and is also mapped to a physical unit number (PUN) with reference to an LUN-to-PUN mapping table.

A physical unit will be briefly explained below. Referring to FIGS. 2A and 2B, physical units 10 and 20 include erase unit headers (EUHs) 11 and 21, block allocation maps (BAMs) 12 and 22, and sets 13 and 23 of blocks where data is stored, respectively.

The EUHs 11 and 21 store various metadata on the respective physical units. The BAMs 12 and 22 may be recorded as at least one block under the respective EUHs.

In addition, the BAMs 12 and 22 may also be recorded as blocks in a space such as a spare array of a NAND flash memory.

The BAMs 12 and 22 may store information on blocks of the respective physical units, such as LBNs and state information of the blocks of the respective physical units.

Therefore, when a request for writing data to a predetermined logic block is issued, a PUN corresponding to the predetermined logic block is obtained, and then data is written to a recordable block of a BAM of the PUN. Thereafter, the address of the predetermined logic block is recorded in the BAM of the PUN.

For example, as shown in FIGS. 3A and 3B, when a request for writing data to logic block 3 is issued twice, data is written to a fourth block of a BAM of a PUN, which is an empty block, in response to the second request, and the serial number of logic block 3 is recorded in the fourth block of the BAM.

Data can be read from a predetermined logic block in almost the same manner as data is written to the predetermined logic block.

A lap count is adopted to indicate block state information, which is used for recovering data in case of errors.

In other words, a predetermined block may exist in a free state (1111), a valid state, or a deleted state (0000). The valid state is classified into s0 (1110), s1 (1100), and s2 (1000) that satisfy the following recursive relationships:

$$s0 < s1,\ s1 < s2,\ \text{and}\ s2 < s0$$

where < indicates the temporal order of two states.

Therefore, if an error occurs in current data, the current data can be recovered using previous or subsequent data.

For example, supposing that an error occurs in fifth data or data subsequent to the fifth data, there are two valid data, the lap counts of which are 1110 and 1100, respectively, as shown in FIG. 4.

Here, since the lap count value 1110 is ahead of the lap count value 1100, righthand data is deleted if a subsequent data-based data recovery method is adopted.

In a flash memory, a logic unit is mapped to a physical unit one by one. In a case where sectors of a predetermined logic unit are frequently updated or in a case where the predetermined logic unit has no empty sectors, an empty physical unit is allocated to the predetermined logic unit, and valid sectors of the predetermined logic unit are copied to the empty physical unit.

Since physical units of a flash memory can be erased only a limited number of times, the physical units of the flash memory should be evenly used in order to increase the durability of the flash memory.

However, there is a clear limit in increasing the durability of a flash memory because, conventionally, empty physical units are used in an arbitrary manner regardless of their respective erasabilities.

In addition, the allocation of an empty physical unit to a logic unit requires additional operations to write data to a flash memory, thus decreasing the efficiency of writing data to the flash memory.

SUMMARY OF THE INVENTION

The present invention provides a method of re-mapping a flash memory, which helps to evenly use the entire area of the flash memory and thus increases the durability of the flash memory.

The present invention also provides a method of re-mapping a flash memory, which minimizes the number of times the flash memory is accessed and thus provides a quick response to a user's request.

In accordance with an aspect of the present invention, there is provided a method of re-mapping a flash memory including arranging a plurality of physical units yet to be mapped according to their erase count values, and sequentially mapping the physical units to a logic unit in such a manner that a physical unit having a smaller erase count value is mapped to the logic unit ahead of a physical unit having a larger erase count value.

The physical units may have a depth value indicating the sequence of mapping the physical units to the logic unit.

A physical unit having a larger depth value may be determined to have been more recently mapped to the logic unit.

The method of re-mapping a flash memory may further include generating empty physical units in the logic unit by performing a compaction operation if there are no physical units yet to be mapped.

A physical unit having a largest depth value may be excluded from the compaction operation.

The generating of the empty physical units in the logic unit may comprise selecting one of a plurality of physical units in the logic unit that has a lowest compaction cost, determining the compaction cost of the selected physical unit as the compaction cost of the logic unit, and copying at least one valid sectors of the selected physical unit to an empty space of the logic unit and excluding the selected physical unit from a list of physical units mapped to the logic unit.

The compaction cost of a physical unit may be determined as the time required for copying at least one valid sector of the physical unit based on the number of valid sectors of the physical unit and the cost of copying the valid sectors of the physical unit.

If the locations of logic sectors stored in a physical unit are fixed, the compaction cost of the physical unit may be obtained using the following equation: $C=Sv*Cc+Se*We$, where C is the compaction cost of the physical unit, Sv is the number of valid sectors of the physical unit, Cc is the cost of copying the valid sectors of the physical unit, Se is the number of empty sectors of a corresponding logic unit, and We is a weight of each of the empty sectors.

If the locations of logic sectors stored in a physical unit are unfixed, the compaction cost of the physical unit may be obtained using the following equation: $C=Sv*Cc$, where C is the compaction cost of the physical unit, Sv is the number of valid sectors of the physical unit, and Cc is the cost of copying the valid sectors of the physical unit.

If valid sectors of a physical unit cannot be copied to an empty space of a corresponding logic unit, a unit allocation cost, which is the cost of allocating an empty physical unit to the corresponding logic unit may be added to the compaction cost of the corresponding logic unit.

The unit allocation cost may be set based on the time required for erasing a physical unit and the time required for writing metadata of the physical unit.

The compaction cost of the physical unit may be obtained using the following equation: $C=Sv*Cc$, where C is the compaction cost of the physical unit, Sv is the number of valid sectors of the physical unit, and Cc is the cost of copying the valid sectors of the physical unit.

The compaction cost of a physical unit that may have a second lowest compaction cost is added to the compaction cost of the corresponding logic unit.

The generating of the empty physical units in the logic unit may further comprise, if there are no empty storage space for copying valid sectors of the logic unit having the lowest compaction cost, searching for physical units having the second lowest compaction cost, mapping a predetermined empty physical unit to the logic unit, and copying at least one valid sectors of the selected physical unit to an empty space of the logic unit and excluding the selected physical unit from a list of physical units mapped to the logic unit.

The method of re-mapping a flash memory may further include determining a maximum and a minimum of the erase count values of physical units mapped to predetermined logic units, and if the maximum and the minimum of the erase count values of the physical units are greater than predetermined value, performing the compaction operation.

The performing of the compaction operation may include performing a compaction operation on the physical unit having the minimum erase count value.

BRIEF DESCRIPTION OF THE DRAWINGS

The above and other aspects of the present invention will become more apparent by describing in detail exemplary embodiments thereof with reference to the attached drawings in which:

FIGS. 1A and 1B are diagrams illustrating an LBN-to-LUN mapping table and a PBN-to-PUN mapping table;

DETAILED DESCRIPTION OF EXEMPLARY EMBODIMENTS THE INVENTION

Figure 2A:
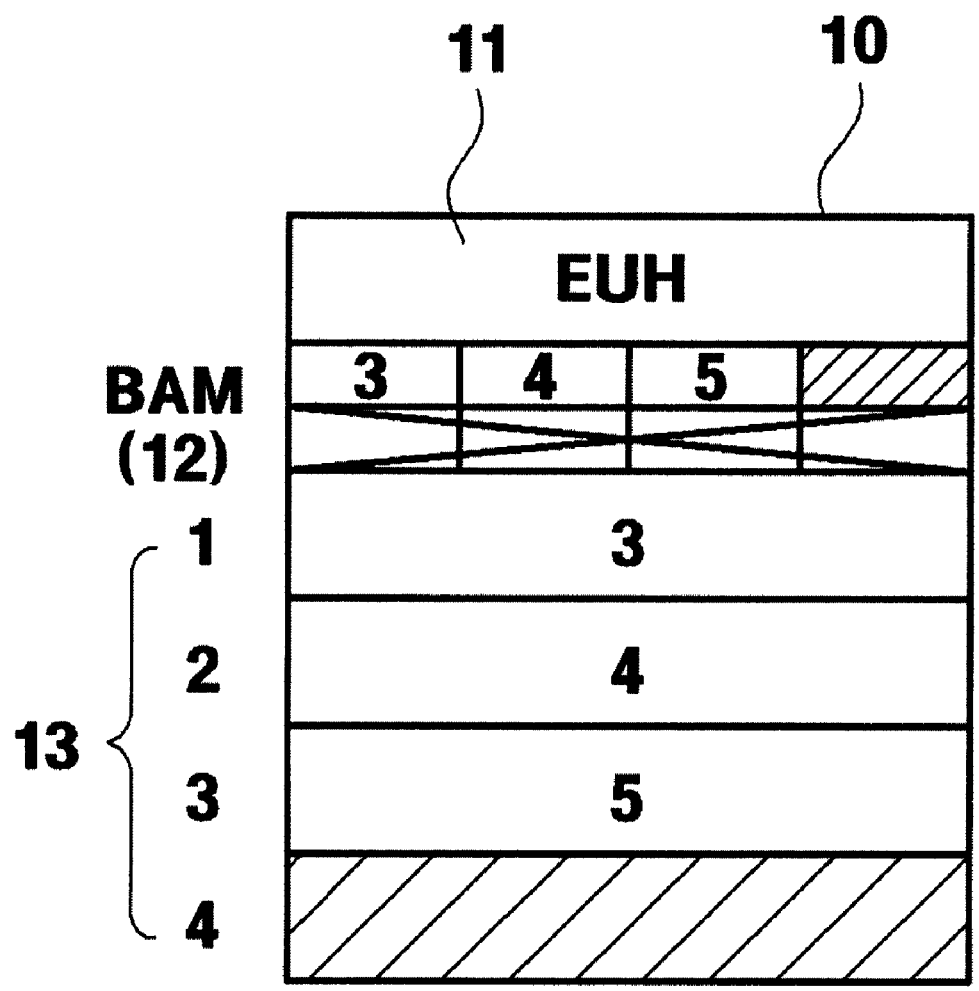
FIGS. 2A and 2B are diagrams illustrating the structures of typical physical units.
Figure 2B:
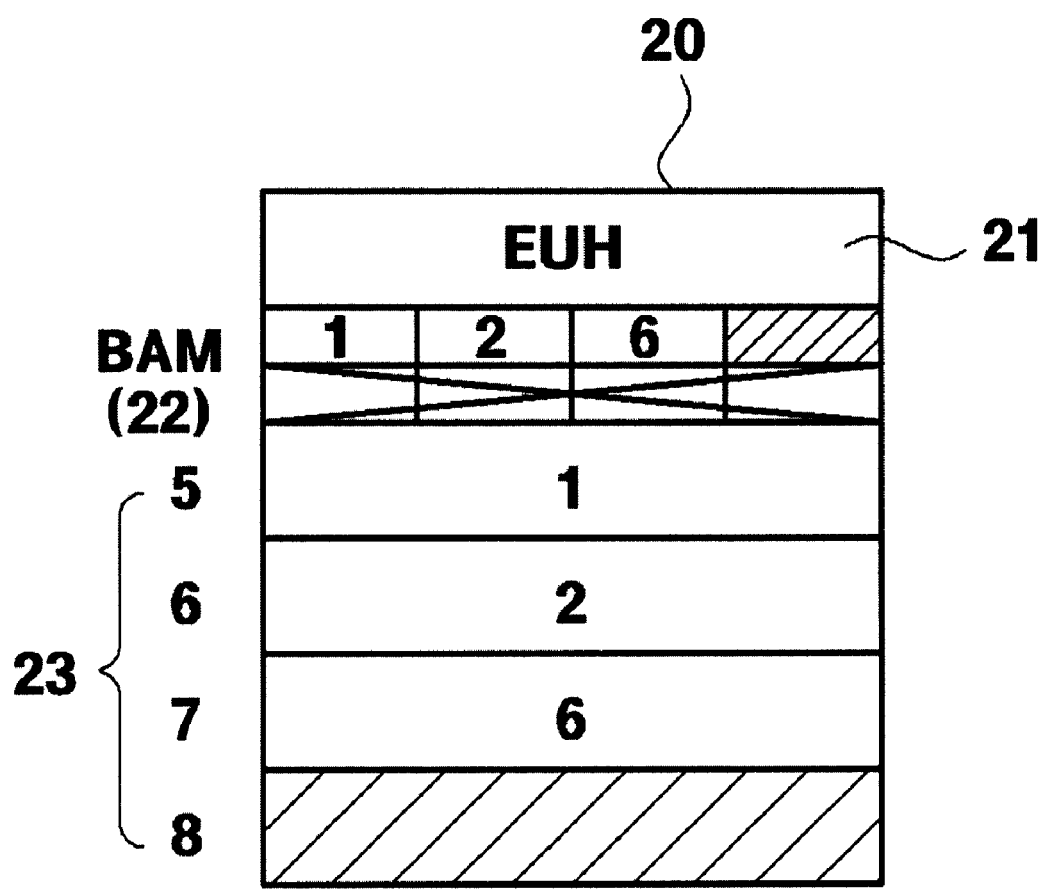
Figure 3A:
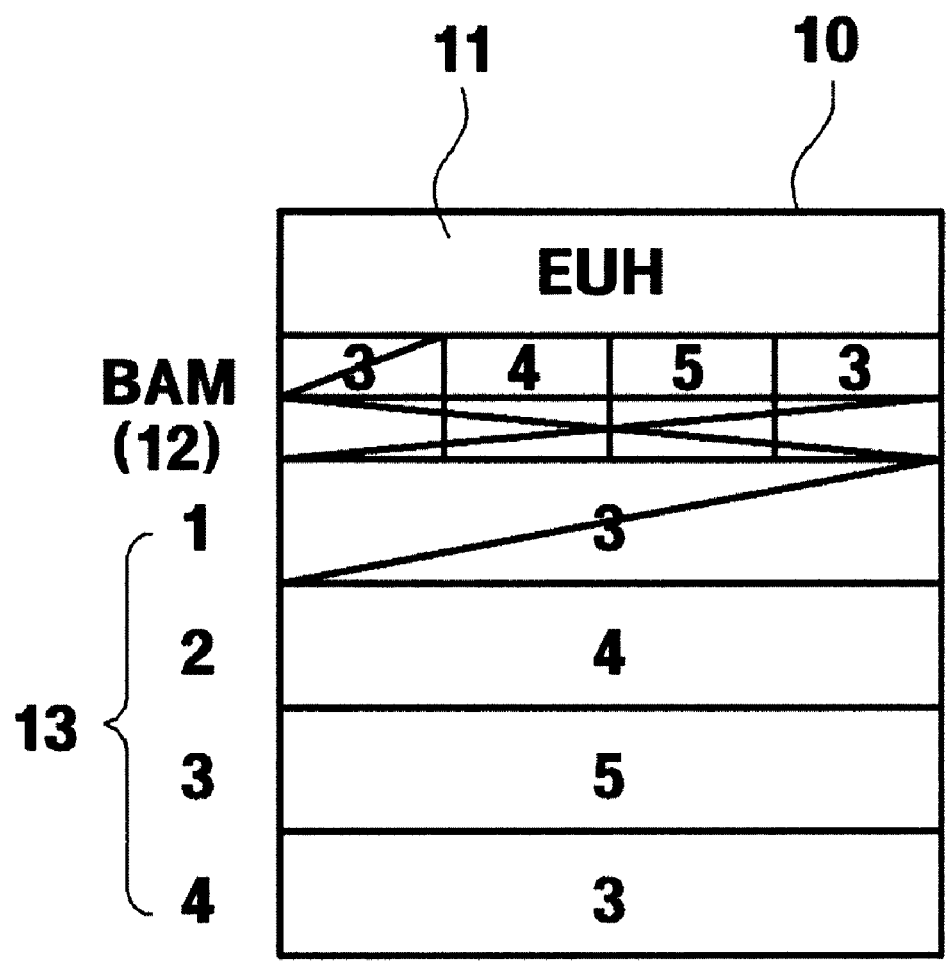
FIGS. 3A and 3B are diagrams illustrating a typical method of writing data to physical units.
Figure 3B:
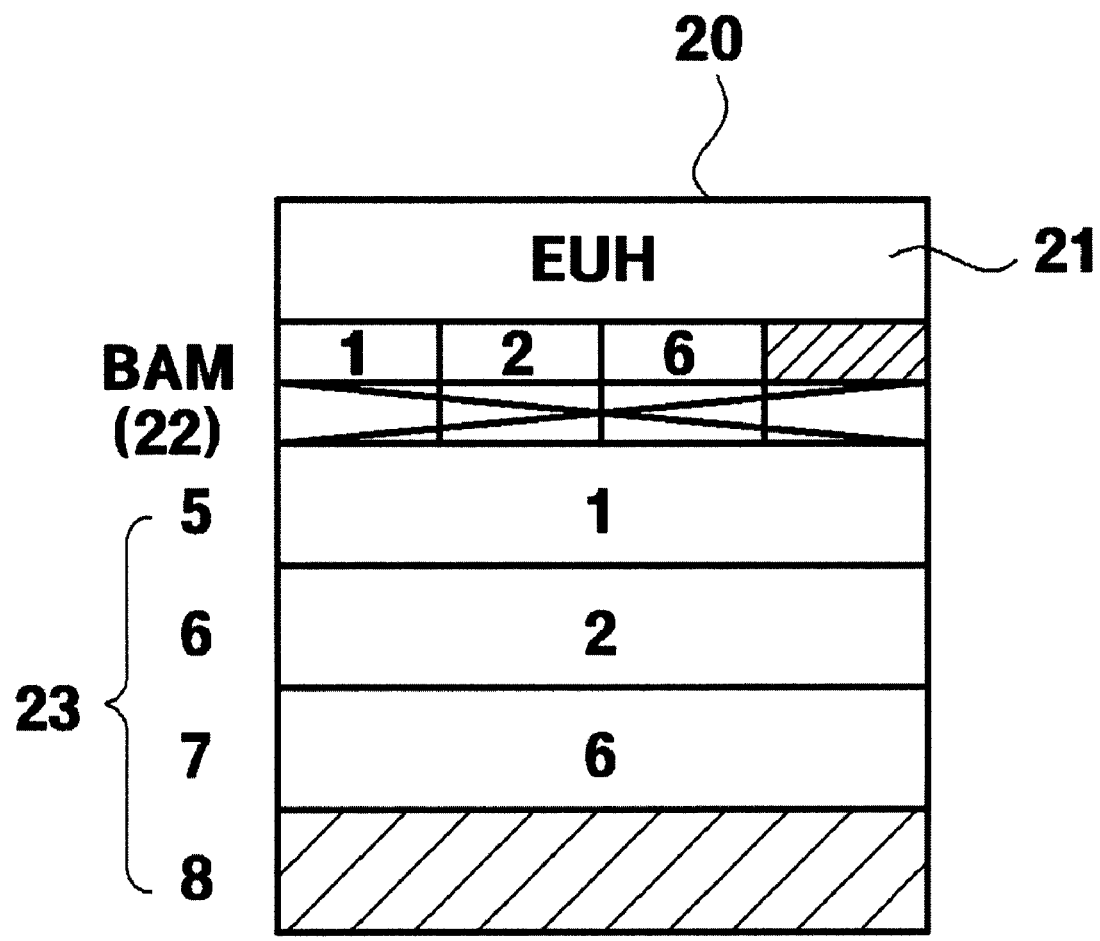
Figure 4:
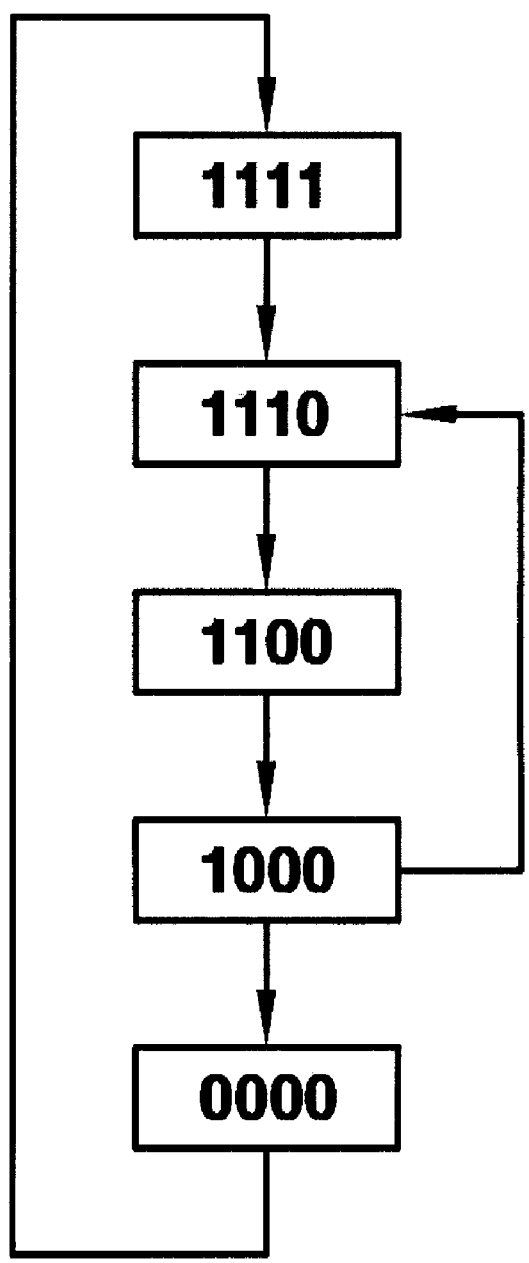
FIG. 4 is a diagram illustrating typical lap counting.

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings in which exemplary embodiments of the invention are shown.

A flash memory is generally classified into a small-block flash memory and a large-block flash memory.

Whereas the small-block flash memory has a logical operation unit and a physical operation unit of the same size, the large-block flash memory has a physical operation unit having a size larger than that of a logical operation unit.

Here, the logical operation unit, which is a data operation unit used by a user, is a generally called a sector, and the physical operation unit, which is a data operation unit used in the flash memory, is generally called a page.

Sizes of the logical and physical operation units may vary according to the type of an apparatus employing the flash memory.

Figure 5:
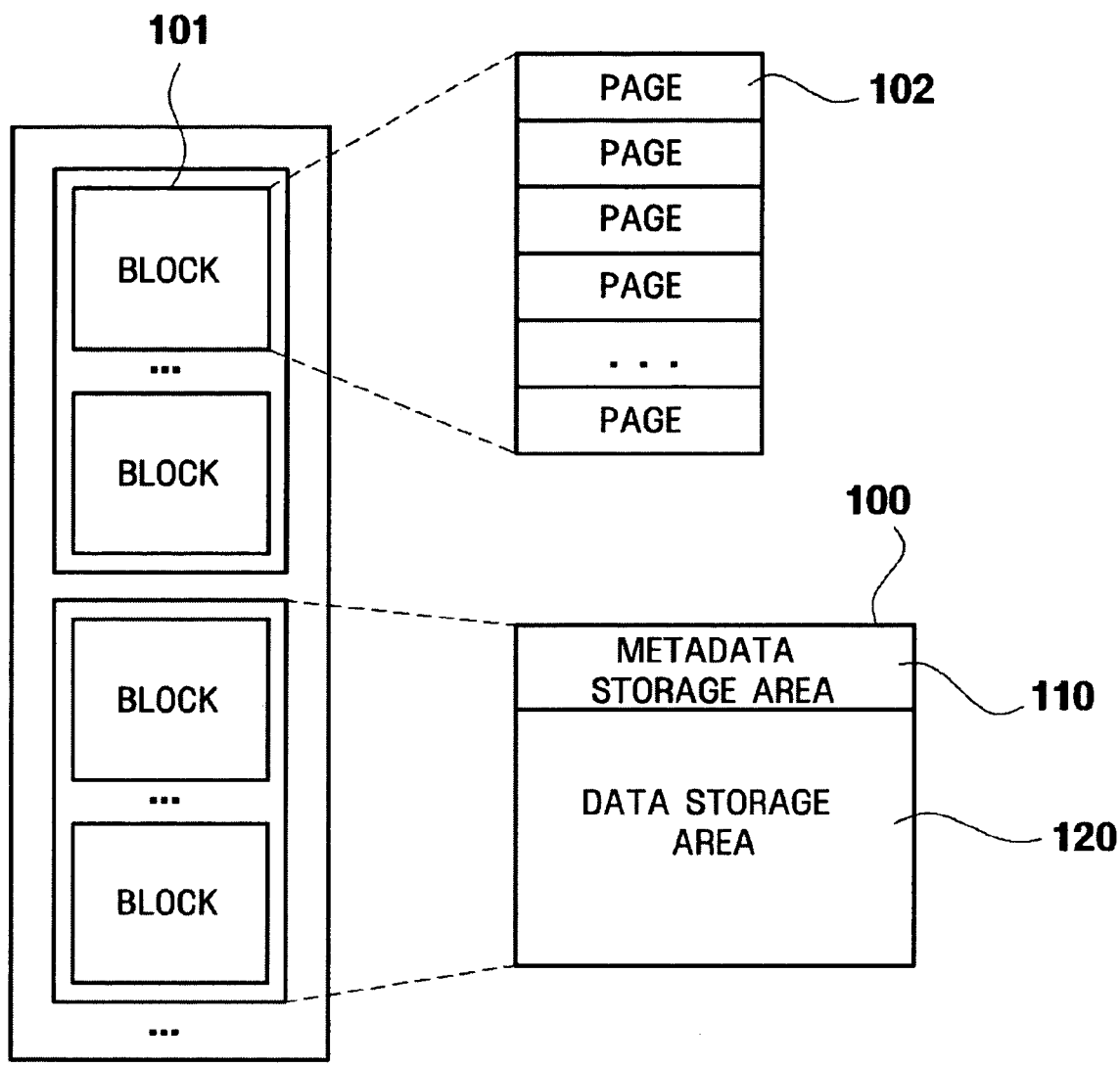
FIG. 5 is a diagram illustrating the structure of a typical large-block flash memory.

FIG. 5 is a diagram illustrating the structure of a large-block flash memory. Referring to FIG. 5, the large-block flash memory includes a plurality of blocks 101. Each of the blocks 101 is comprised of a plurality of pages 102. A logic unit 100 is comprised of at least one block 101, i.e., at least one physical unit. Each block contained in the logical unit will be called a physical unit hereinafter.

The logic unit 100 is classified into a mapped logic unit or a non-mapped logic unit. While a mapped logic unit has valid sectors, a non-mapped logic unit has no valid sectors and thus can be mapped later.

The logical unit 100 includes a metadata storage area 110 in which a logical unit number (LUN) of the corresponding logical unit is stored, and a data storage area 120 in which data is stored.

Figure 6:
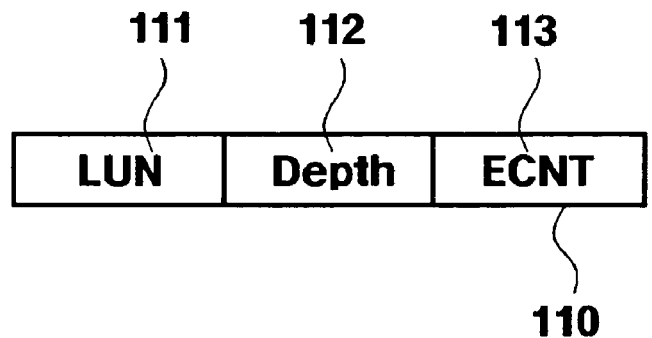
FIG. 6 is a diagram illustrating a metadata storage area of a logical unit according to an exemplary embodiment of the present invention.

FIG. 6 is a diagram illustrating the metadata storage area 110 of FIG. 5. Referring to FIG. 6, the metadata storage area 110 includes depth information 112, which specifies the order of physical units mapped to a logic unit, and erase count information (ECNT) 113, which indicates erase count values of the physical units mapped to the logic unit.

A physical unit that has been most recently mapped to a logic unit has a largest depth value and is determined as most recent data.

Figure 7:
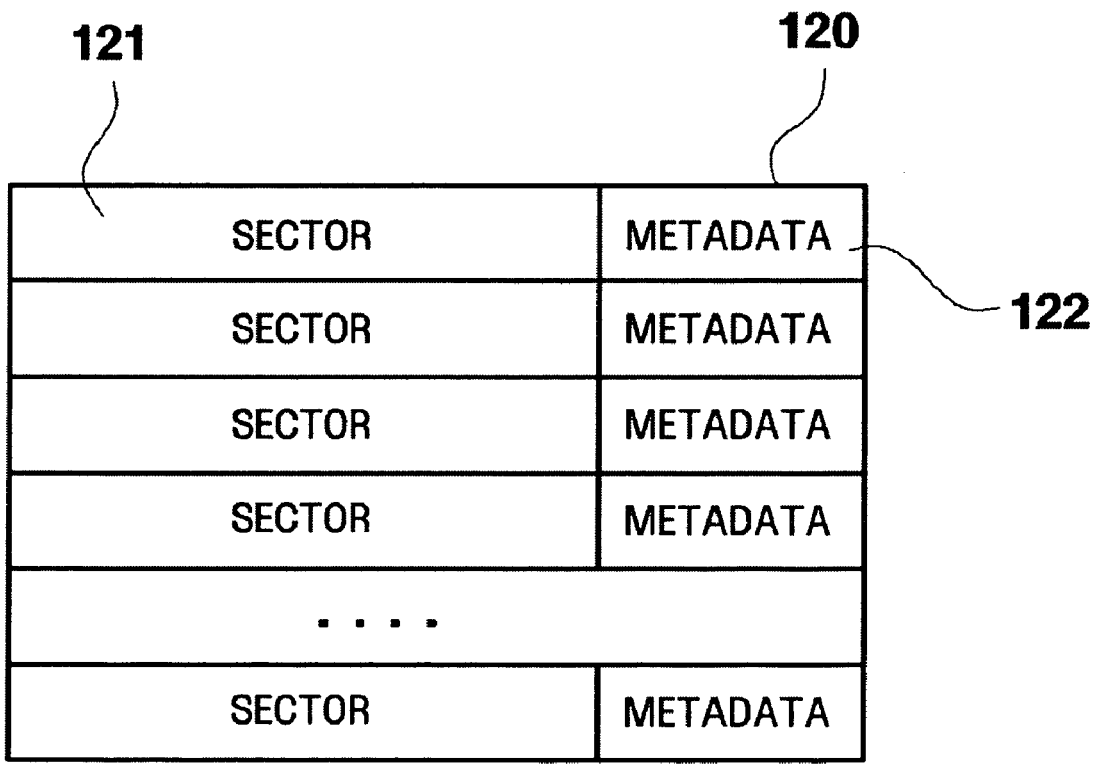
FIG. 7 is a diagram illustrating a data storage area of a logical unit according to an exemplary embodiment of the present invention.

FIG. 7 is a diagram illustrating the data storage area 120 of FIG. 5. Referring to FIG. 7, the data storage area 120 includes physical sectors 121 in which data is stored and metadata 122 in which logical sector numbers (LSNs) of the physical sectors 121 are stored.

Figure 8:
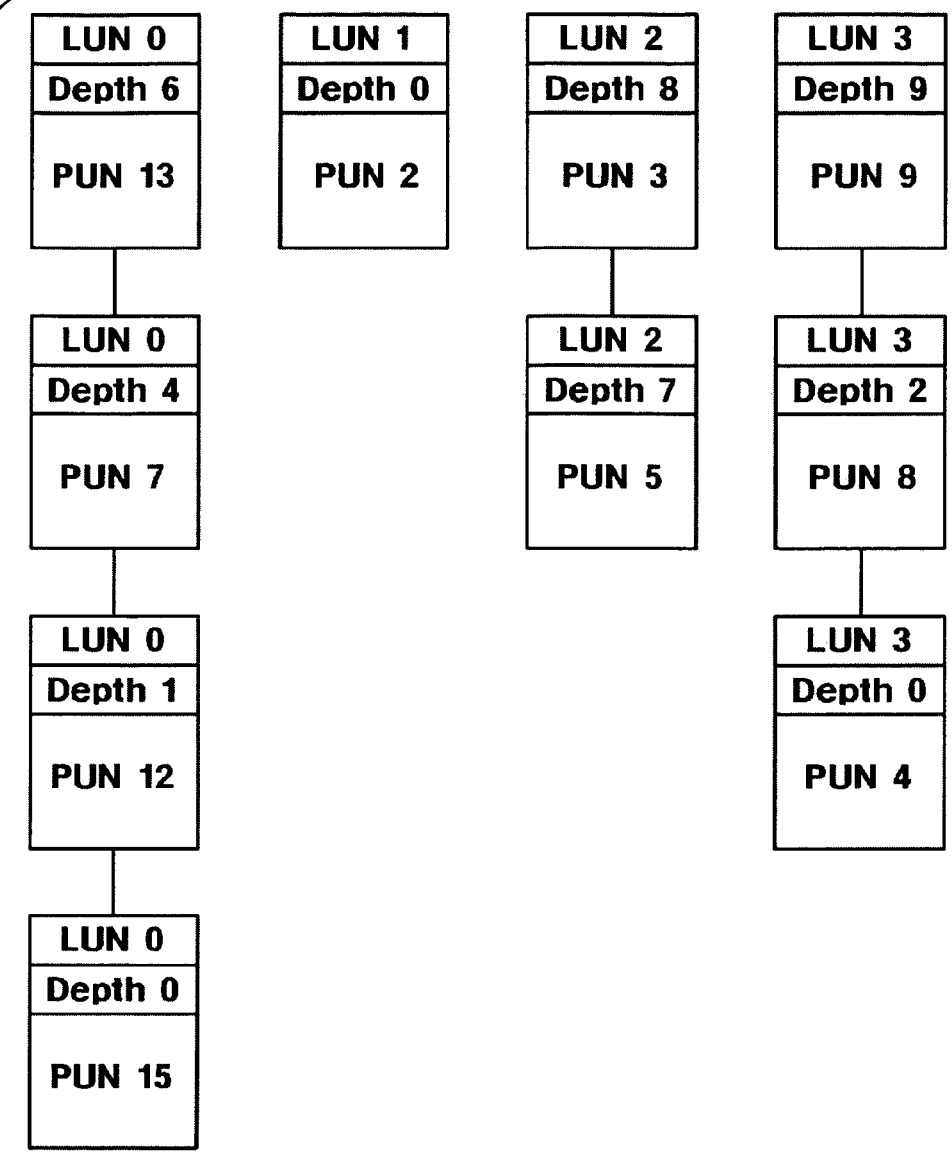
FIG. 8 is a diagram illustrating logical units and physical units which are mapped to the logical units.

FIG. 8 is a diagram illustrating logic units and physical units mapped to the logic units.

Referring to FIG. 8, physical units that are mapped to the same logic unit are arranged according to their depth values. A physical unit having a larger depth value is considered as more recent data than a physical unit having a smaller depth value.

Physical units of a flash memory may have different durabilities, i.e., different erase count values. In order to increase the durability of the flash memory, physical units having a smaller erase count value should be used ahead of physical units having a larger erase count value.

Figure 9:
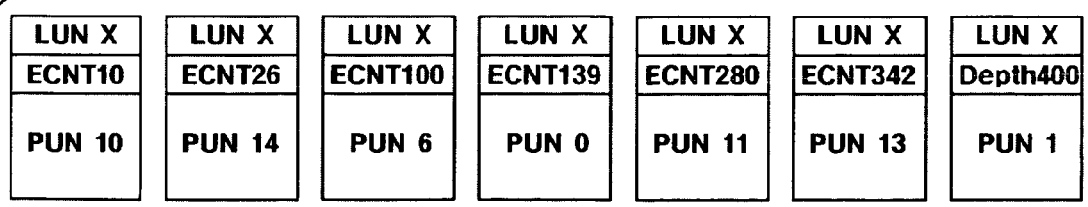
FIG. 9 is a diagram illustrating physical units that are yet to be mapped to logical units and are arranged according to their erase count values.

In a method of re-mapping a flash memory according to an exemplary embodiment of the present invention, which helps to evenly use all of a plurality of physical units of a flash memory, some of the physical units that are yet to be mapped are arranged according to their erase count values in such a manner that a physical unit having a smaller erase count value is followed by a physical unit having a larger erase count value, as shown in FIG. 9.

The physical units that are yet to be mapped have no valid sectors and thus can be mapped later.

The physical units that are yet to be mapped are mapped to logic units in such a manner that a physical unit having a smaller erase count value is mapped ahead of a physical unit having a larger erase count value.

Figure 10:
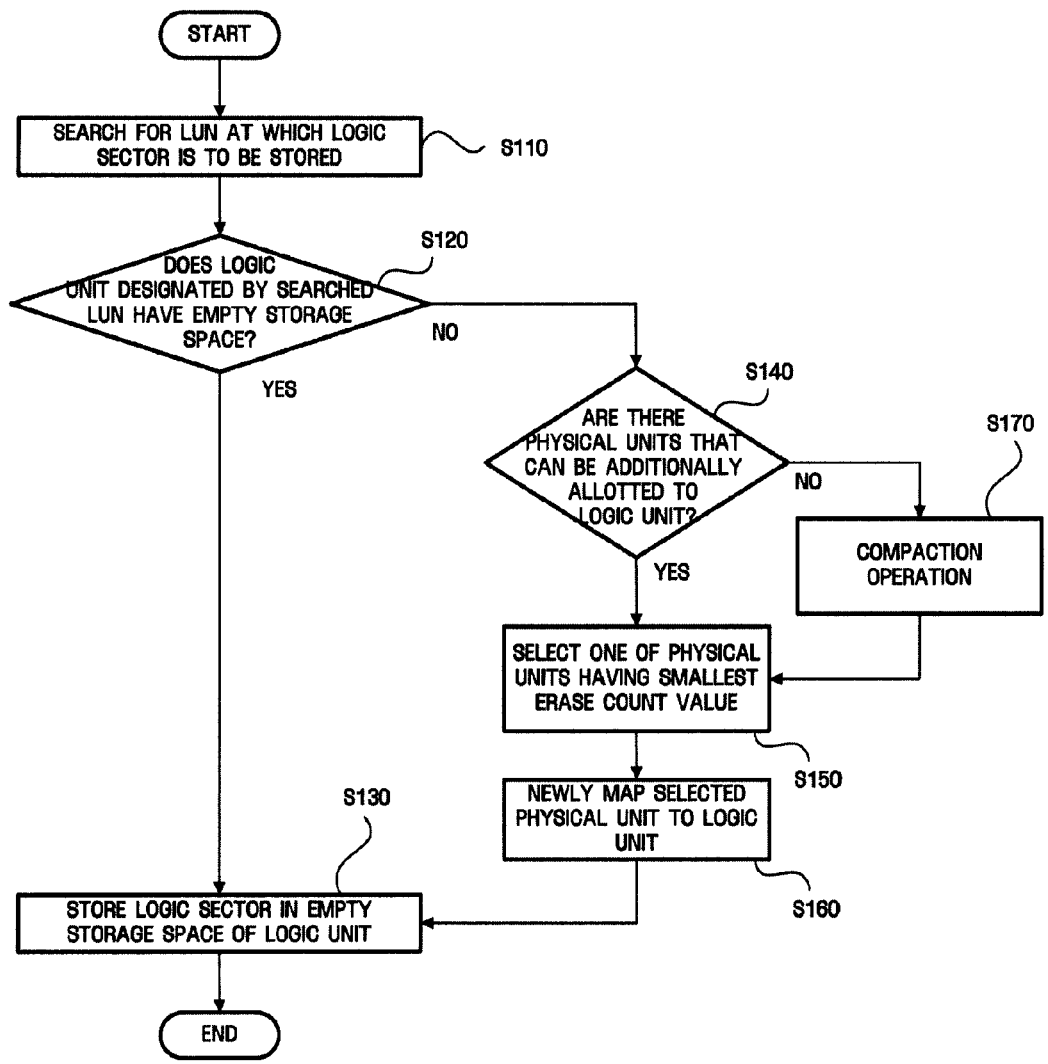
FIG. 10 is a flowchart of a method of writing data to a logic sector according to an exemplary embodiment of the present invention.

FIG. 10 is a flowchart of a method of writing a logic sector according to an exemplary embodiment of the present invention. Referring to FIG. 10, in operation S110, an LUN at which predetermined data is to be stored is searched for.

In operation S120, it is determined whether a logic unit designated by the searched LUN has an empty storage space.

In operation S130, if the logic unit has an empty storage space, the predetermined data is stored in the logic unit.

In operation S140, if the logic unit has no empty storage space, it is determined whether there are physical units that can be additionally mapped to the logic unit.

In operation S150, if there are physical units that can be additionally mapped to the logic unit, one of the physical units having a smallest erase count value is selected. In operation S160, the selected physical unit is additionally mapped to the logic unit.

Thereafter, the predetermined data is written to the physical unit additionally mapped to the logic unit.

If there are no physical units that can be additionally mapped to the logic unit in operation S140, physical units that are yet to be mapped are generated by performing a compaction operation on physical units that are currently mapped to other logic units, and one of the generated physical units having a smallest erase count value is selected and then mapped to the logic unit in operation S170.

Here, the compaction operation is a process of generating at least one empty physical unit by re-mapping physical units to the logic units being currently mapped with a mapping ratio of N:1 to have a mapping ratio N−1:1 (where N>2).

In other words, in the compaction operation, one of a plurality of physical units mapped to a logic unit is selected, and valid sectors of the selected physical unit are copied to sectors of other physical units, thereby generating at least one empty physical unit.

Figure 11:
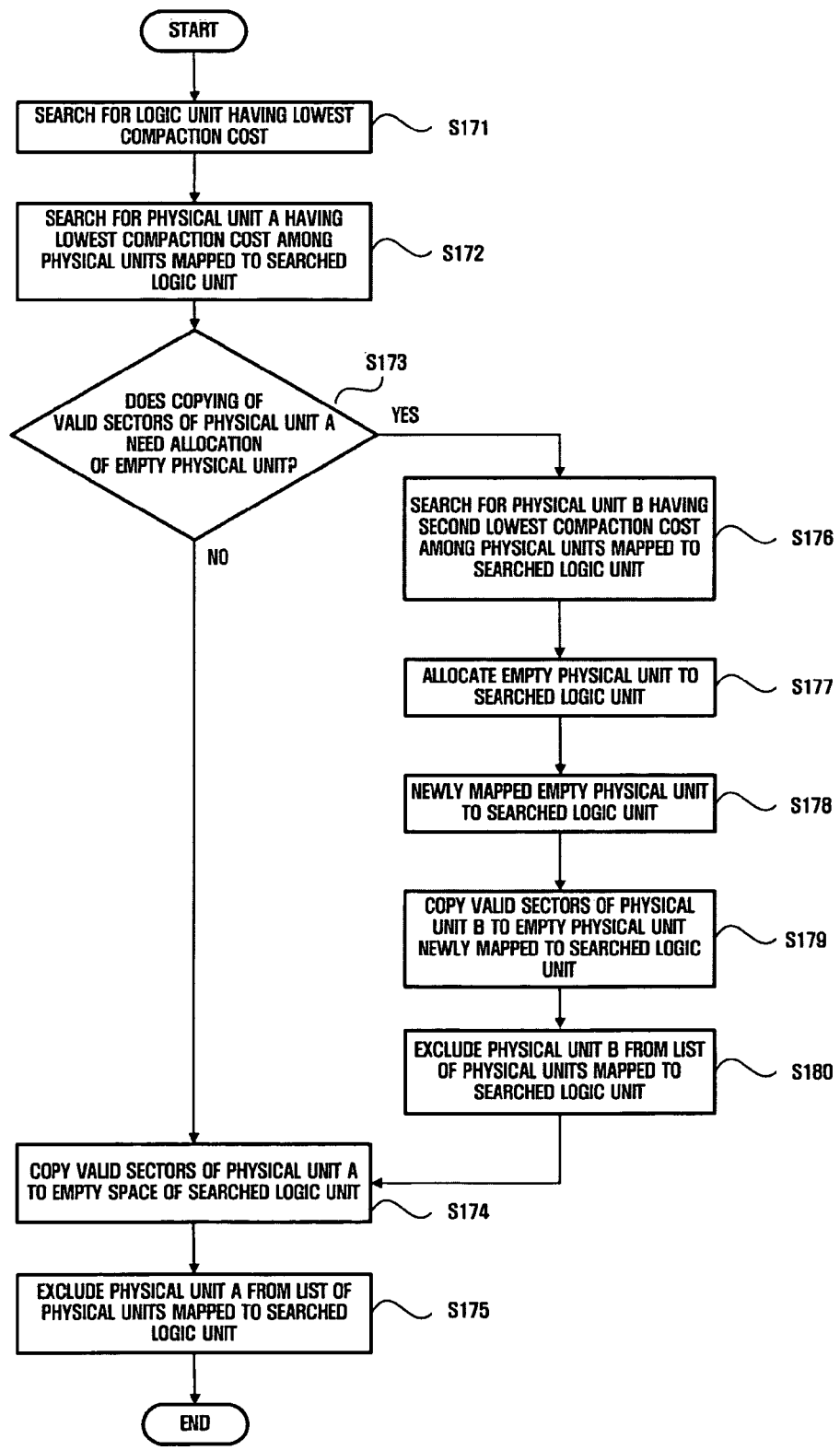
FIG. 11 is a flowchart of a compaction method according to an exemplary embodiment of the present invention.

The compaction operation will now be described more fully with reference to FIG. 11. Referring to FIG. 11, in operation S171, a logic unit having a lowest compaction cost is selected from among a plurality of logic units to each of which at least one physical unit is mapped.

In order to obtain the compaction cost of each of the logic units, the compaction costs of physical units mapped to a corresponding logic unit should be calculated. The compaction cost of each of the physical units mapped to the corresponding logic unit is obtained as the time required for copying valid sectors of a corresponding physical unit in consideration of the number of valid sectors of the corresponding physical unit.

In other words, the compaction costs of the physical units mapped to the corresponding logic unit correspond to the time required for generating an empty physical unit for the corresponding logic unit and can be obtained using the number of times a flash memory is accessed.

The accessing of a flash memory includes erasing physical units, writing sectors, copying sectors, and reading sectors.

For example, suppose that the cost of erasing a physical unit is 10, the cost of writing a sector is 3, the cost of copying a sector is 4, and the cost of reading a sector is 1. Therefore, if one physical unit is erased and a total of 12 sectors are copied for a predetermined logic unit in the compaction operation, the compaction cost of the predetermined logic unit is 58.

Thereafter, a minimum among the compaction costs of the physical units mapped to the corresponding logic unit is determined as the compaction cost of the corresponding logic unit.

Of the physical units mapped to the corresponding logic unit, the physical unit that has been most recently mapped to the corresponding logic unit is excluded from the compaction operation because the copying of valid sectors of the physical unit that has been most recently mapped to the corresponding logic unit always requires allocation of an empty physical unit to the corresponding logic unit.

Therefore, the compaction cost of the physical unit that has been most recently mapped to the corresponding logic unit should not be determined as the compaction of the corresponding logic unit even though it is the minimum among the compaction costs of the physical units mapped to the corresponding logic unit.

If valid factors of the physical unit whose compaction cost is determined as the compaction cost of the corresponding logic unit cannot be copied to an empty space of the corresponding logic unit, an empty physical unit should be allocated to the corresponding logic unit, and thus the cost of allocating an empty physical unit to the corresponding logic unit is added to the compaction cost of the corresponding logic unit.

One of the physical units mapped to the corresponding logic unit having a second lowest compaction cost is selected, and its compaction cost is added to the compaction cost of the corresponding logic unit.

In this manner, the compaction cost of each of the logic units to each of which at least one physical unit is mapped is obtained, and one of the logic units having a lowest compaction cost is searched for in operation S171.

In operation S172, a physical unit A which is mapped to the searched logic unit and has a lowest compaction cost is searched for.

In operation S173, it is determined whether the copying of valid sectors of the physical unit A needs an empty physical unit.

In operation S174, if no empty physical unit is needed to copy the valid sectors of the physical unit A, the valid sectors of the physical unit A are copied to an empty space of the searched logic unit.

In operation S175, if the copying of the valid sectors of the physical unit A to the empty space of the searched logic unit is complete, the physical unit A is excluded from a list of physical units mapped to the searched logic unit.

In operation S176, if the copying of the valid sectors of the physical unit A needs an empty physical unit, a physical unit B which is mapped to the searched logic unit and has a second lowest compaction cost is searched for.

In operation S177, an empty physical unit is allocated to the searched logic unit.

In operation S178, the empty physical unit is mapped to the searched logic unit.

In operation S179, the physical unit B is copied to the empty physical unit.

In operation S180, the physical unit B is excluded from the list of physical units mapped to the searched logic unit, and the compaction method returns to operation S175.

The compaction operation may provide slightly different results depending on whether the locations of logic sectors stored in a physical unit are fixed.

Figure 12:
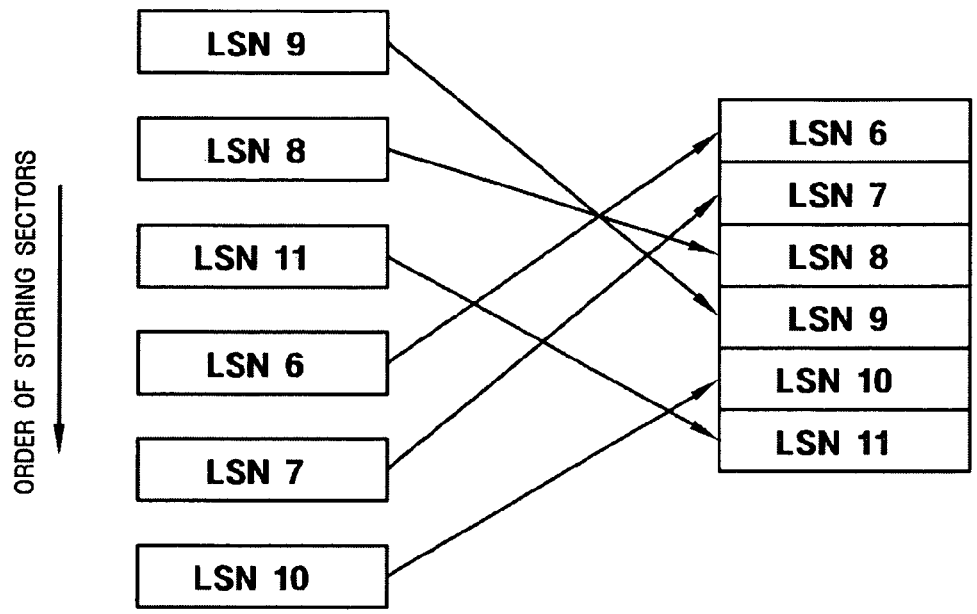
FIG. 12 is a diagram illustrating a case where the locations of logic sectors stored in a physical unit are fixed.
Figure 13:
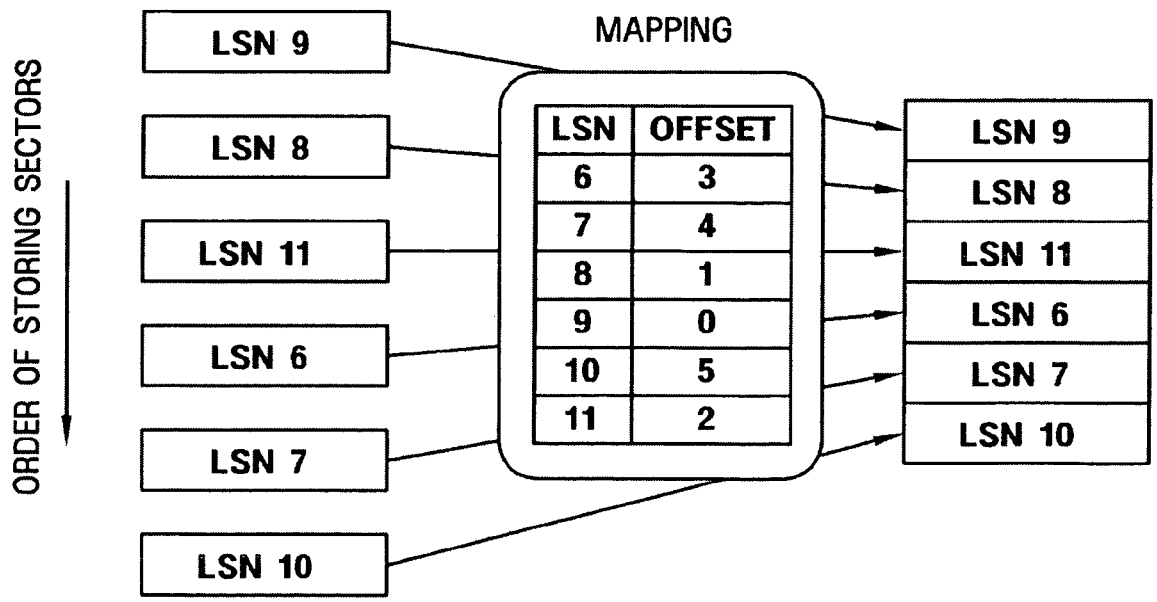
FIG. 13 is a diagram illustrating a case where the locations of logic sectors stored in a physical unit are unfixed.

In other words, the locations of logic sectors stored in a physical unit may be fixed, as shown in FIG. 12, or may not be fixed, as shown in FIG. 13.

Figure 14:
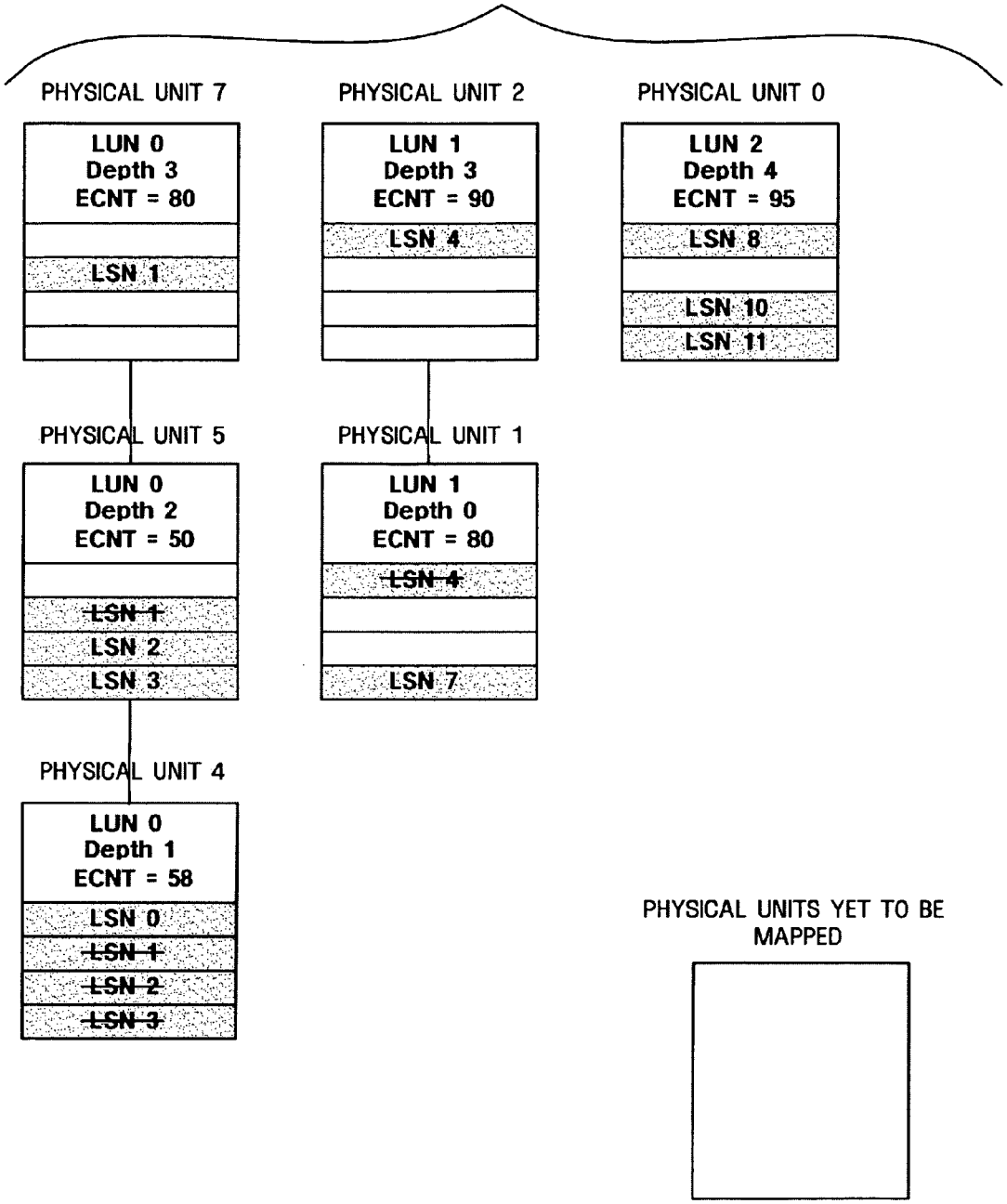
FIGS. 14 through 16 are diagrams illustrating a compaction method according to an exemplary embodiment of the present invention in a case where the locations of logic sectors stored in a physical unit are fixed.
Figure 15:
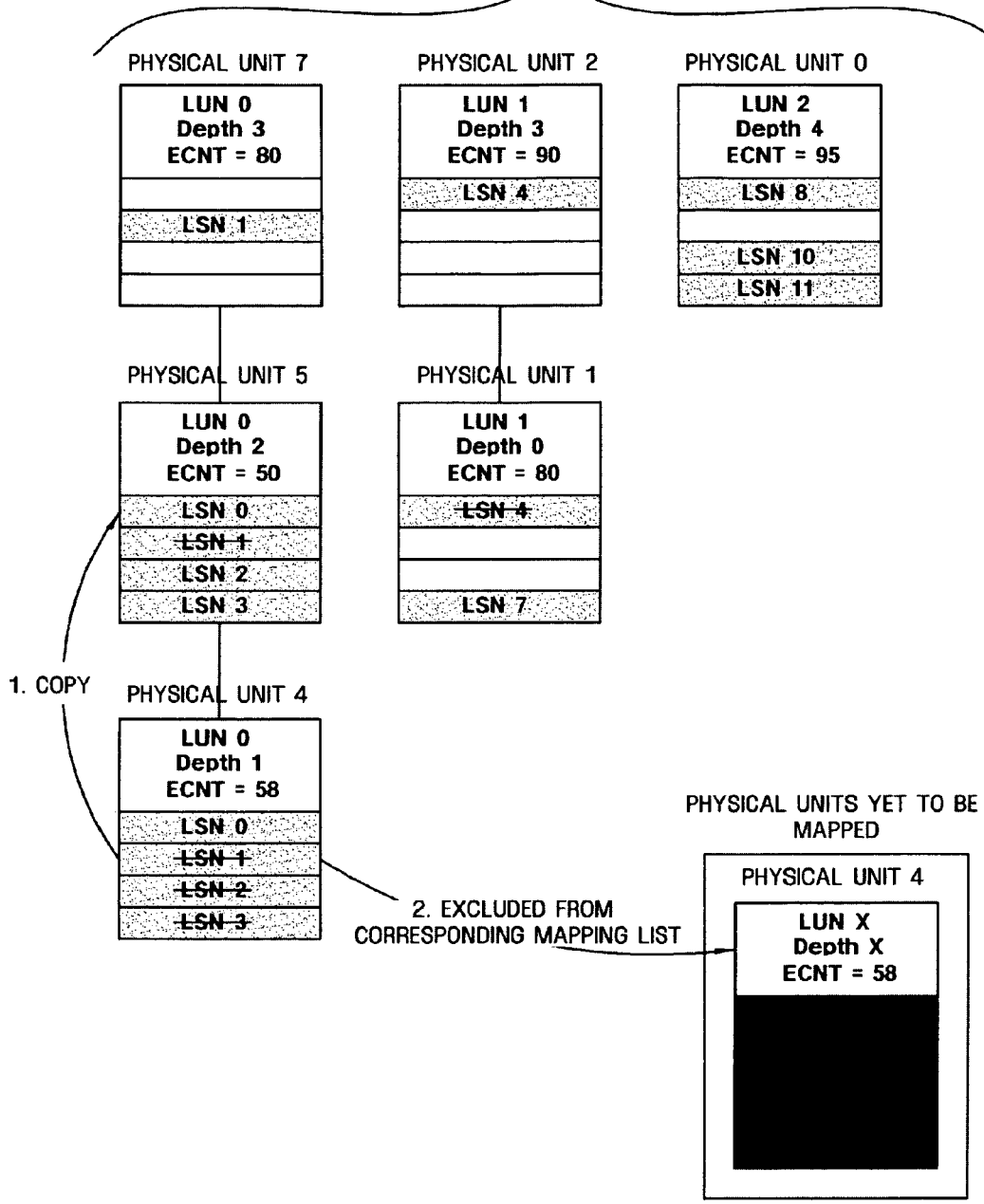
Figure 16:
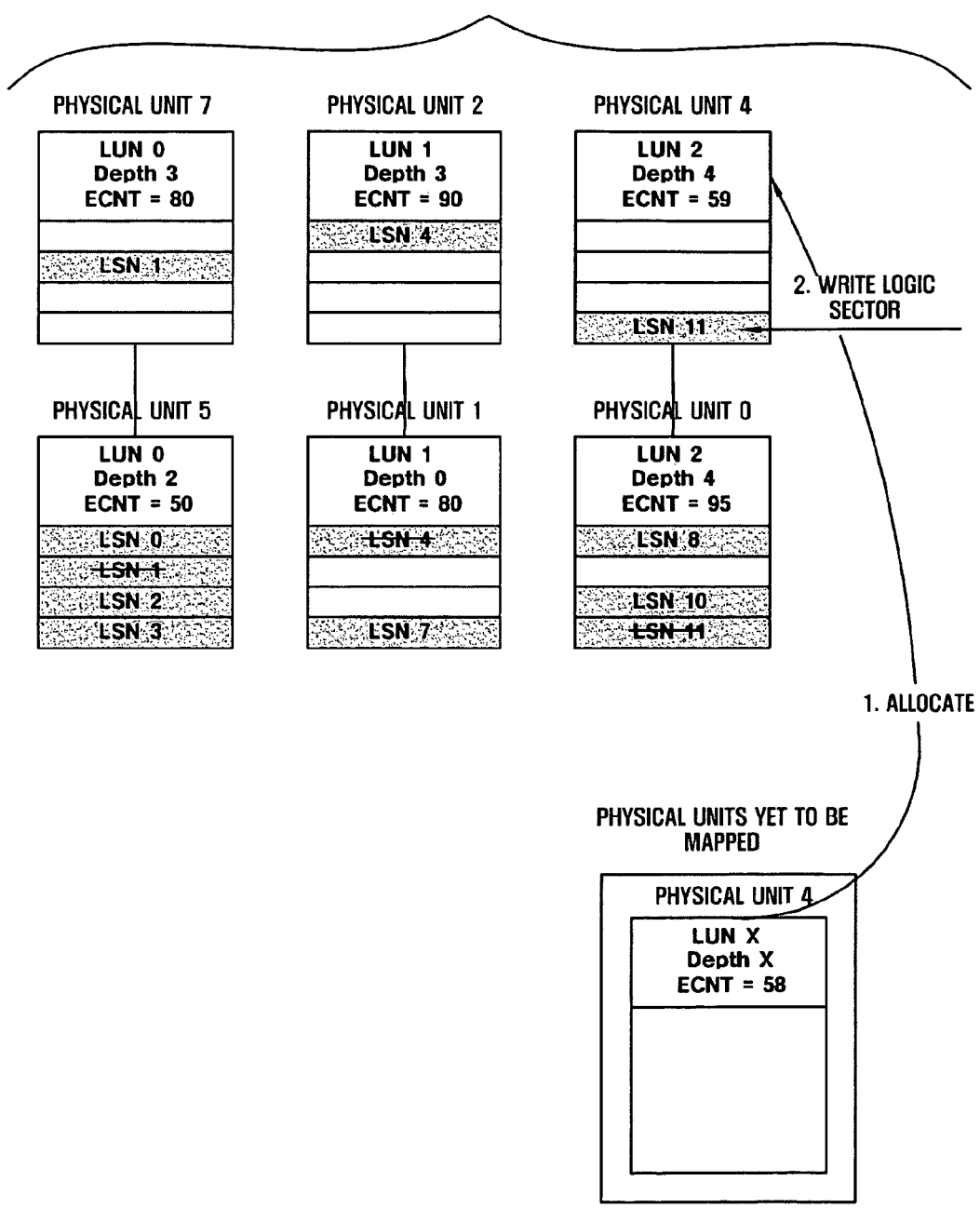

FIGS. 14 through 16 are diagrams illustrating a compaction method according to an exemplary embodiment of the present invention in a case where the locations of logic sectors stored in a physical unit are fixed.

Referring to FIG. 14, a plurality of physical sectors are mapped to a logic unit. Specifically, logic sectors 0 through 3 are stored in logic unit 0, logic sectors 4 through 7 are stored in logic unit 2, and logic sectors 8 through 11 are stored in logic unit 3.

Physical units 7, 5, and 4 are mapped to logic unit 0, physical units 2 and 1 are mapped to logic unit 1, and physical unit 0 is mapped to logic unit 2.

As described above, in order to obtain the compaction cost of a logic unit, the compaction costs of physical units mapped to the logic unit should be calculated.

The compaction cost of each of the physical units mapped to the logic unit is obtained using the following equation: $C=Sv*Cc+Se*We$, where C is compaction cost of a corresponding physical unit, Sv is the number of valid sectors of the corresponding physical unit, Cc is the cost of copying each of the valid sectors of the corresponding physical unit, Se is the number of empty sectors of a corresponding logic unit, and We is a weight of each of the empty sectors.

For example, if the copying cost Cc is 3 and the weight We is 0.5, the compaction cost of physical unit 7 mapped to logic unit 0 is 4.5 (=1*3+3*0.5), the compaction cost of physical unit 5 mapped to logic unit 0 is 6.5 (=2*3+1*0.5), and the compaction cost of physical unit 4 mapped to logic unit 0 is 3 (=1*3+0*0.5).

Here, physical unit 7 is excluded from the compaction operation because it is determined as most recent data based on its depth value. Therefore, physical unit 4 having the lowest compaction cost is selected, and one valid sector of physical unit 4 is copied to physical unit 5.

The compaction cost of physical unit 4, i.e., 3, is determined as the compaction cost of logic unit 0.

Meanwhile, the compaction cost of physical unit 2 mapped to logic unit 1 is 4.5, as obtained in the same manner as those of physical units 7, 5 and 4. The compaction cost of physical unit 1 mapped to logic unit 1 is 4.

In this case, since physical unit 2 is determined to have been most recently mapped to logic unit 1, it is excluded from the compaction operation. Thus, one valid sector of physical unit 1 is copied to physical unit 2, and the compaction cost of physical unit 1 is determined as the compaction cost of logic unit 1.

In this case, only one physical unit, i.e., physical unit 0, is mapped to logic unit 2. Thus, logic unit 2 is excluded from the compaction operation.

Here, in the case of writing, for example, logic sector 11, logic sector 11 is stored in logic unit 2.

However, logic unit 2 has no empty sector at the required position, an empty physical unit is generated for logic unit 2 through a compaction operation.

As described above, among logic units 0, 1, and 2, logic unit 0 has the lowest compaction cost, and among physical units 7, 5, and 4 mapped to logic unit 0, physical unit 4 has the lowest compaction cost.

Thus, one valid sector of physical unit 4 is copied to physical unit 5, and physical unit is excluded from a list of physical units mapped to logic unit 0, as shown in FIG. 15.

Thereafter, as shown in FIG. 16, physical unit 4, which has been excluded from the list of physical units mapped to logic unit 0, is mapped to logic unit 2, and physical sector 11 is stored in physical unit 4.

Figure 17:
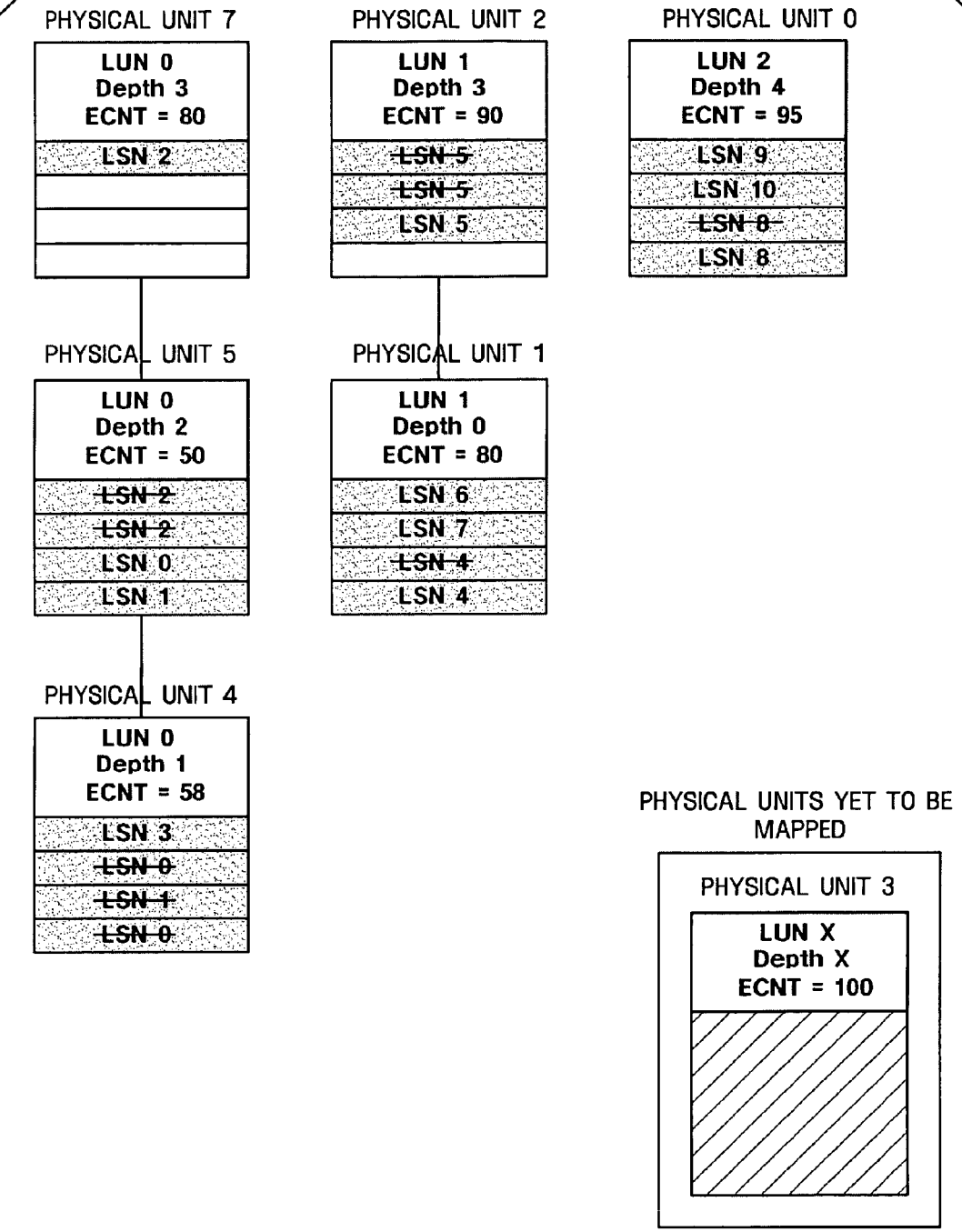
FIGS. 17 through 19 are diagrams illustrating a compaction method according to an exemplary embodiment of the present invention in a case where the locations of logic sectors stored in a physical unit are unfixed.

An alternative case where the locations of logic sectors stored in a physical unit are unfixed will now be described with reference to FIGS. 17 through 19, which illustrate a compaction method according to an exemplary embodiment of the present invention in a case where the locations of logic sectors stored in a physical unit are unfixed. Referring to FIG. 17, a plurality of physical units are mapped to a logic unit. Suppose that a total of 4 logic sectors are sequentially stored in empty spaces of one physical unit.

Logic sectors 0 through 3 are stored in logic unit 0, logic sectors 4 through 7 are stored in logic unit 1, and logic sectors 8 through 11 are stored in logic unit 2.

Physical units 7, 5, and 4 are mapped to logic unit 0, physical unit 2 and 1 are mapped to logic unit 2, and logic unit 0 is mapped to logic unit 2.

The compaction cost of each of logic units 0, 1, and 2 is calculated at the beginning of initializing a system and may be updated whenever it needs to be updated.

The compaction cost of a physical unit is obtained using the following equation: $C=Sv*Cc$, where C is the compaction cost of the physical unit, Sv is the number of valid sectors of the physical unit, and Cc is the copying cost of the physical unit.

The cost of allocating an empty physical unit to a logic unit is obtained using the following equation: $Q=Uc+Iw$, where Q is the allocation cost of the logic unit, Uc is the cost of erasing a unit, and Iw is the cost of writing metadata.

For example, if the copying cost Cc is 3, the unit erasing cost Uc is 10, and the metadata writing cost Iw is 2, the compaction cost of physical unit 7 is 3 (1*3), the compaction cost of physical unit 5 is 6 (2*3), and the compaction cost of physical unit 4 is 3 (1*3).

Since physical unit 7 is determined to have been most recently mapped to logic unit 0, the compaction cost of physical unit 4 is determined as the compaction cost of logic unit 0.

In addition, the compaction cost of physical unit 2 is 3 (1*3), and the compaction cost of physical unit 1 is 9 (3*3). Since physical unit 2 is determined to have been most recently mapped to logic unit 1, the compaction cost of physical unit 1 is determined as the compaction cost of logic unit 1.

In this case, since three valid sectors of physical unit 1 cannot be copied to logic unit 1, an empty physical unit should be allocated, and the compaction cost of logic unit 1 should be updated accordingly. Thus, the compaction cost of logic unit 1 is updated by adding a unit allocation cost of 12 to the compaction cost of physical unit 1, i.e., 9. Accordingly, the resulting compaction cost of logic unit 1 becomes 21.

Since physical unit 2 has the second lowest compaction cost, the compaction cost of logic unit 1 should be further updated by adding the compaction cost of physical unit 2, i.e., 3, to the previously updated compaction cost of logic unit 1, i.e., 21. Accordingly, the resulting compaction cost of logic unit 1 becomes 24.

Meanwhile, since only one physical unit, i.e., physical unit 0, is mapped to logic unit 2, logic unit 2 is excluded from the compaction operation.

In the case of writing, for example, logic sector 11, logic sector 11 is stored in logic unit 2.

However, logic unit 2 has no empty sector, and thus a compaction operation needs to be performed. As a result of the compaction operation, of logic units 0, 1, and 2, logic unit 0 is determined to have the lowest compaction cost.

In addition, among physical units 7, 5, and 4 mapped to logic unit 0, physical units 7 and 4 are determined to have the lowest compaction cost, but physical unit 4 is finally selected because physical unit 7 is determined to have been most recently mapped to logic unit 0. Therefore, one valid sector of physical unit 4 is copied to an empty sector of logic unit 0, in which case, the allocation of an empty physical sector is not required.

Figure 18:
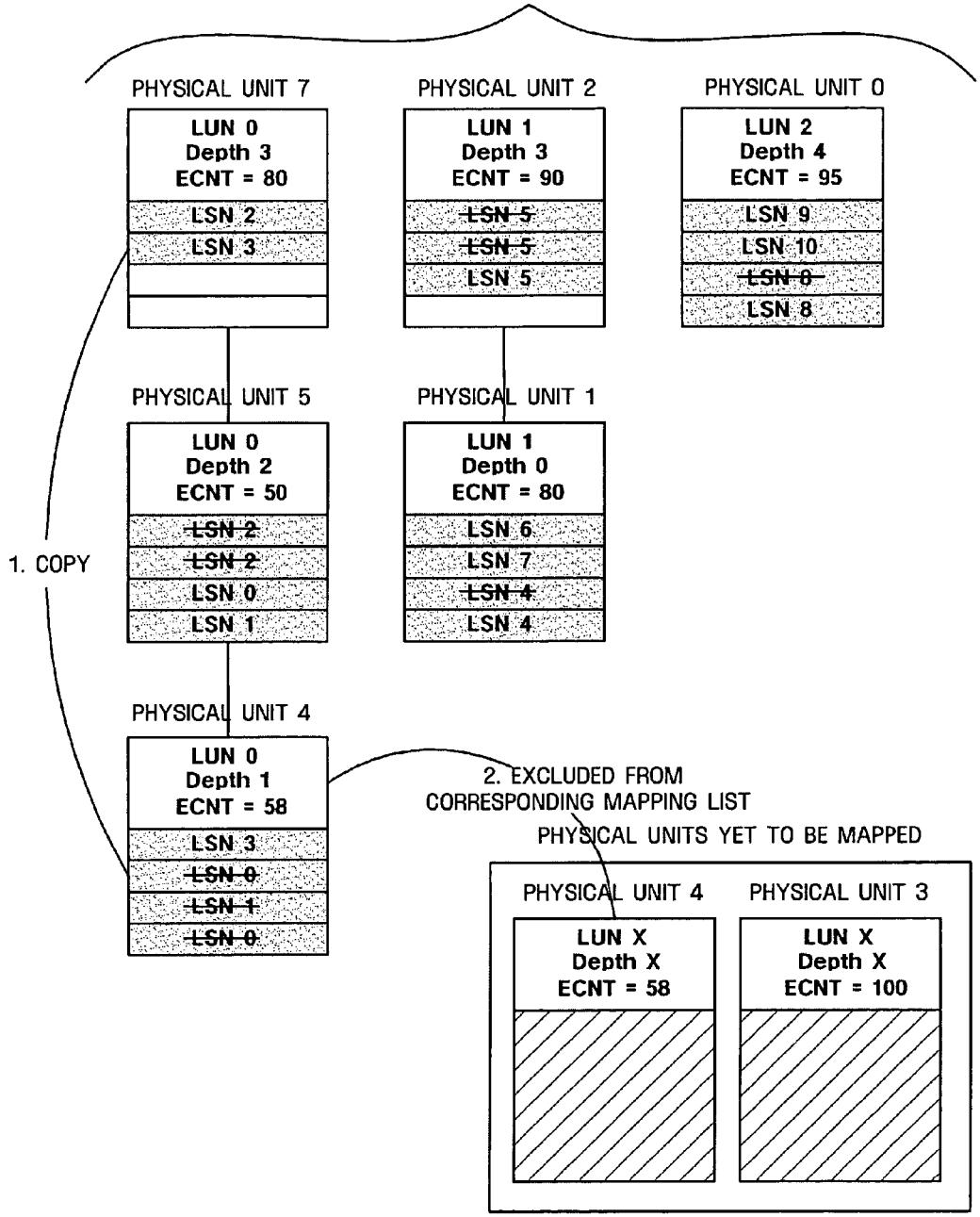

Accordingly, as shown in FIG. 18, logic sector, which is a valid sector of physical unit 4, is copied to an empty sector of physical unit 7, and then physical unit 4 is excluded from a list of physical units mapped to logic unit 0.

Figure 19:
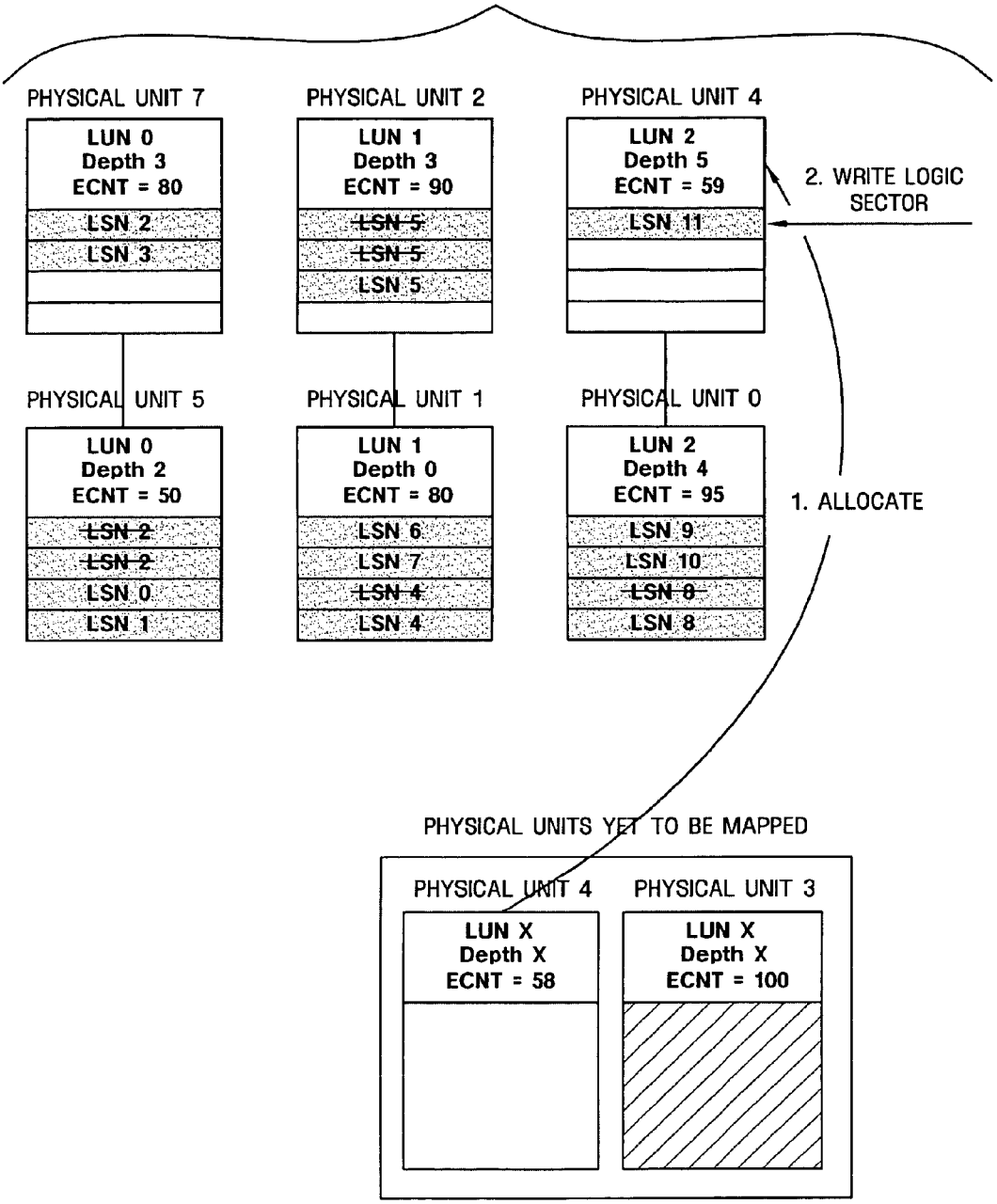

Thereafter, as shown in FIG. 19, physical unit 4, which has been excluded from the list of physical units mapped to logic unit 0, is selected from among a plurality of physical units yet to be mapped because it has a smallest erase count value and then is newly mapped to logic unit 2.

Therefore, logic sector 11 is written to a first sector of physical unit 4 newly mapped to logic unit 2.

In the present embodiment, of a plurality of physical units that are yet to be mapped, the physical unit having a smallest erase count value is used ahead of the rest of the physical units.

If there are only a small number of physical units yet to be mapped, a wear leveling operation as well as a compaction operation may be performed in order to guarantee more even use of the physical units.

In addition, if a difference between a maximum and a minimum of erase count values of physical units is outside a predetermined range, valid sectors of a physical unit having the minimum erase count value are copied to empty sectors of a corresponding logic unit, and the physical unit having the minimum erase count value is excluded from a list of physical units mapped to the corresponding logic unit.

A method of writing data using this type of wear leveling operation will now be described with reference to FIG. 20.

Figure 20:
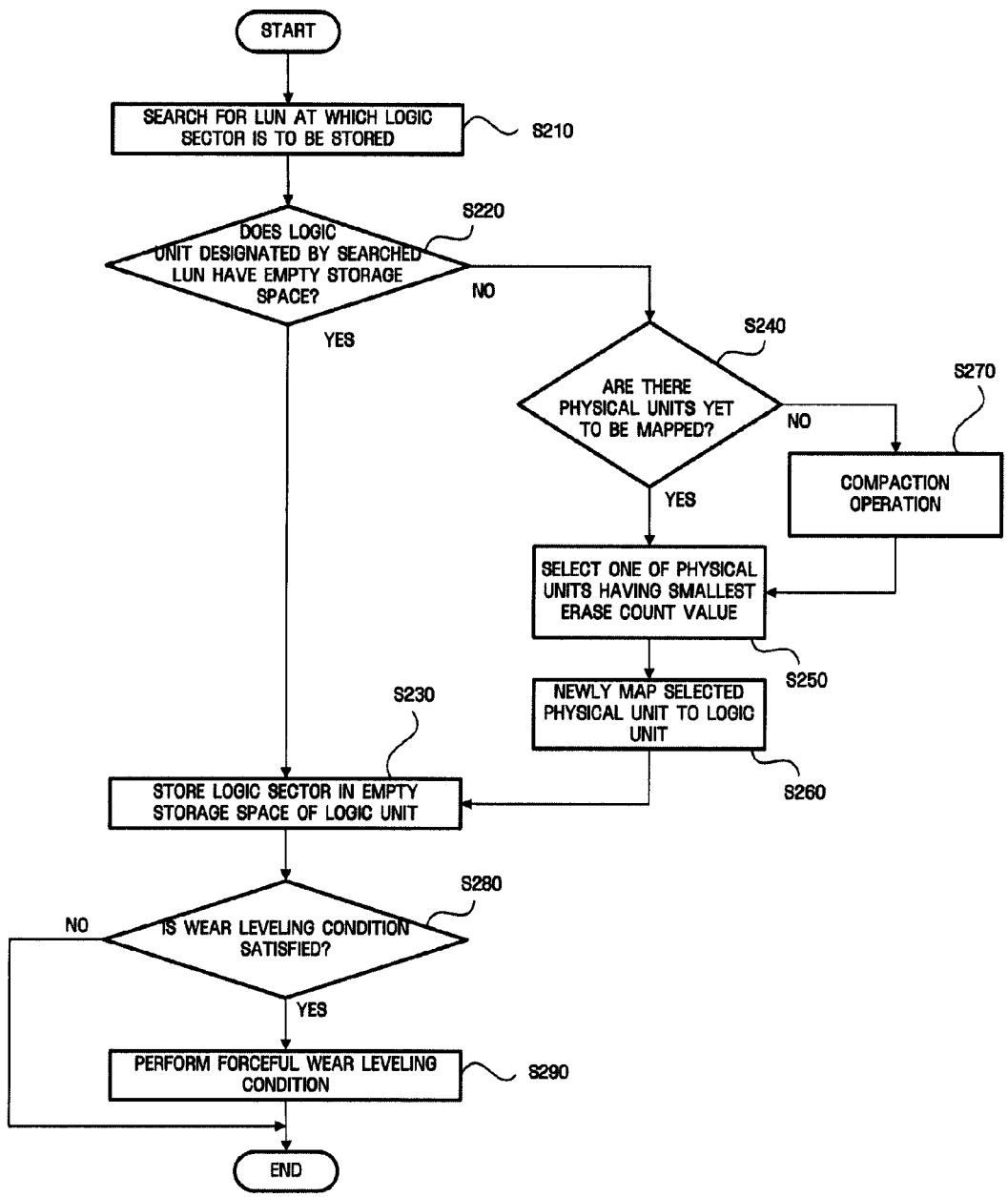
FIG. 20 is a flowchart of a forceful compaction method according to an exemplary embodiment of the present invention.

Referring to FIG. 20, in operation S210, an LUN at which predetermined data is to be stored is searched for.

In operation S220, it is determined whether a logic unit designated by the searched LUN has an empty storage space.

In operation S230, if the logic unit has an empty storage space, the predetermined data is stored in the empty storage space of the logic unit.

In operation S240, if the logic unit has no empty storage space, it is determined whether there are physical units that can be additionally mapped to the logic unit.

In operation S250, if there are physical units that can be additionally mapped to the logic unit, one of the physical units having a smallest erase count value is selected.

In operation S260, the selected physical unit is newly mapped to the logic unit.

Thereafter, the predetermined data is written to an empty space of the selected physical unit newly mapped to the logic unit.

In operation S270, if there are no physical units that can be additionally mapped to the logic unit, physical units yet to be mapped are generated through a compaction operation, and one of the generated physical units is newly mapped to the logic unit.

Figure 21:
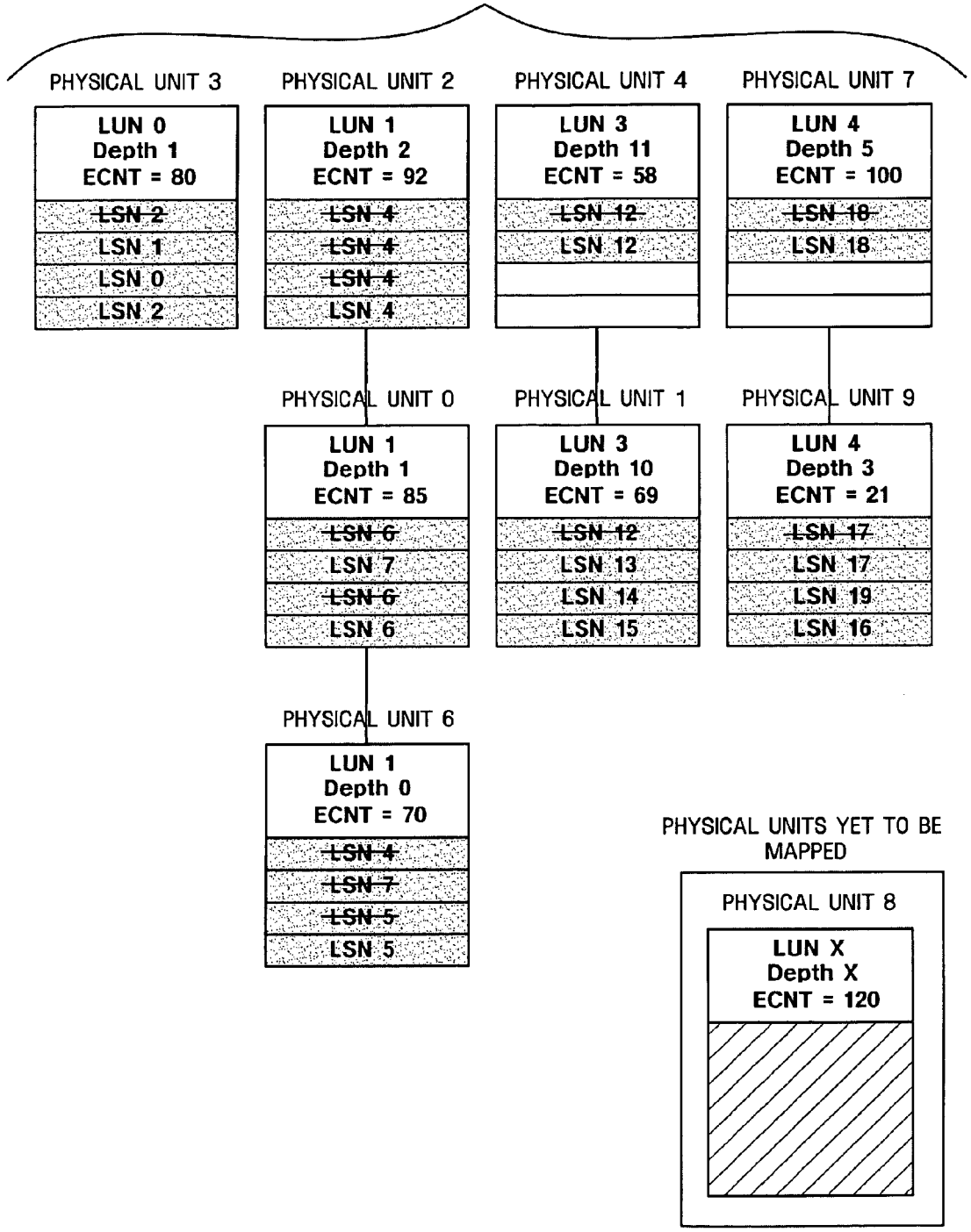
FIGS. 21 through 24 are diagrams illustrating a compaction operation in the forceful compaction method according to the exemplary embodiment of the present invention.

Logic units with only one physical unit mapped thereto, such as logic unit 0 of FIG. 21, are excluded from the compaction operation.

Referring to FIG. 21, the compaction cost of physical unit 2 is 3 (=1*3), the compaction cost of physical unit 0 is 6 (=2*3), and the compaction cost of physical unit 6 is 3 (=1*3).

Physical unit 2 is excluded from the compaction operation because it is determined to have been most recently mapped to logic unit 1. Accordingly, physical unit 6 having the lowest compaction cost is determined as the compaction cost of logic unit 1.

Since a valid sector of physical unit 6 cannot be copied to an empty sector of logic unit 1, an empty physical unit should be allocated. Thus, the compaction cost of logic unit 1 should be updated by adding a unit allocation cost of 12 to the compaction cost of physical unit 4.

Accordingly, the resulting compaction cost of logic unit 1 becomes 15. In addition, of physical units 2 and 0, physical unit 2 has the lowest compaction cost.

Thus, the compaction cost of logic unit 1 should be further updated by adding the compaction cost of physical unit 2, i.e., 3, to the previously updated compaction cost of logic unit 1, i.e., 15. Accordingly, the resulting compaction cost of logic unit 1 becomes 18.

The compaction cost of physical unit 4 is 3 (=1*3), and the compaction cost of physical unit 1 is 9 (=3*3). Since physical unit 4 is determined to have been most recently mapped to logic unit 3, the compaction cost of physical unit 1 is determined as the compaction cost of logic unit 3. Since all of 3 valid sectors of physical unit 1 cannot be copied to an empty space of logic unit 3, an empty physical unit should be allocated.

Thus, the compaction cost of logic unit 3 should be updated by adding a unit allocation cost of 12 to the compaction cost of physical unit 1. Accordingly, the resulting compaction cost of logic unit 3 becomes 21.

In addition, the compaction cost of logic unit 1 should be further updated by adding the compaction cost of physical unit 4, i.e., 3, to the previously updated compaction cost of logic unit 3, i.e., 21.

Accordingly, the resulting compaction cost of logic unit 3 becomes 24.

The compaction cost of physical unit 7 is 3 (=1*3), and the compaction cost of physical unit 9 is 9 (=3*3).

Since physical unit 7 is determined to have been most recently mapped to logic unit 4, the compaction unit of physical unit 4 is determined as the compaction cost of logic unit 4.

Since all of three valid sectors cannot be copied to an empty space of logic unit 4, an empty physical unit should be allocated.

Thus, the compaction cost of logic unit 4 should be updated by adding a unit allocation cost of 12 to the compaction cost of physical unit 9. Accordingly, the resulting compaction cost of logic unit 4 becomes 21.

In addition, the compaction cost of logic unit 1 should be further updated by adding the compaction cost of physical unit 7, i.e., 3, to the previously updated compaction cost of logic unit 21, i.e., 21. Accordingly, the resulting compaction cost of logic unit 3 becomes 24.

Figure 22:
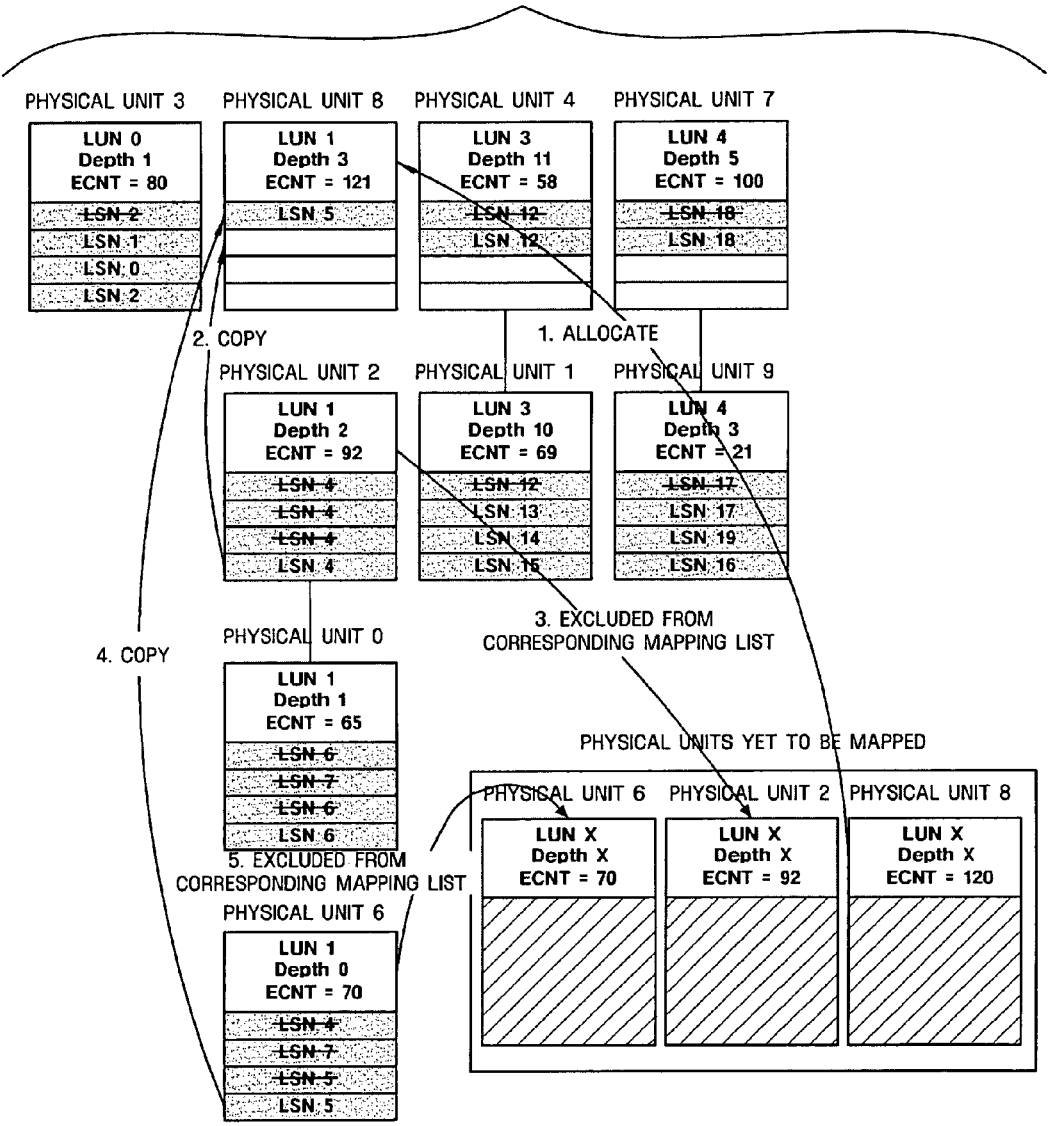

A method of writing logic sector 0 to logic unit 0 having no empty sector will now be described with reference to FIGS. 21 through 23.

Among logic units 0, 1, 2, and 3, logic unit 1 has the lowest compaction cost. Among physical units 2, 0, and 6, physical unit 6 has the lowest compaction cost.

A valid sector of physical unit 6 cannot copied to logic unit 1 because logic unit 1 has no empty sector.

Thus, an empty physical unit should be allocated. Therefore, as shown in FIG. 22, a physical unit yet to be allocated is newly mapped to logic unit 1.

Physical unit 2 has the second lowest compaction cost, a valid sector of physical unit 2 is copied to the physical unit newly mapped to logic unit 1, and then physical unit 2 is excluded from a list of physical units mapped to logic unit 1.

Thereafter, the valid sector of physical unit 6 is copied to the physical unit newly mapped to logic unit 1, and then physical unit 6 is excluded from the list of physical units mapped to logic unit 1.

Figure 23:
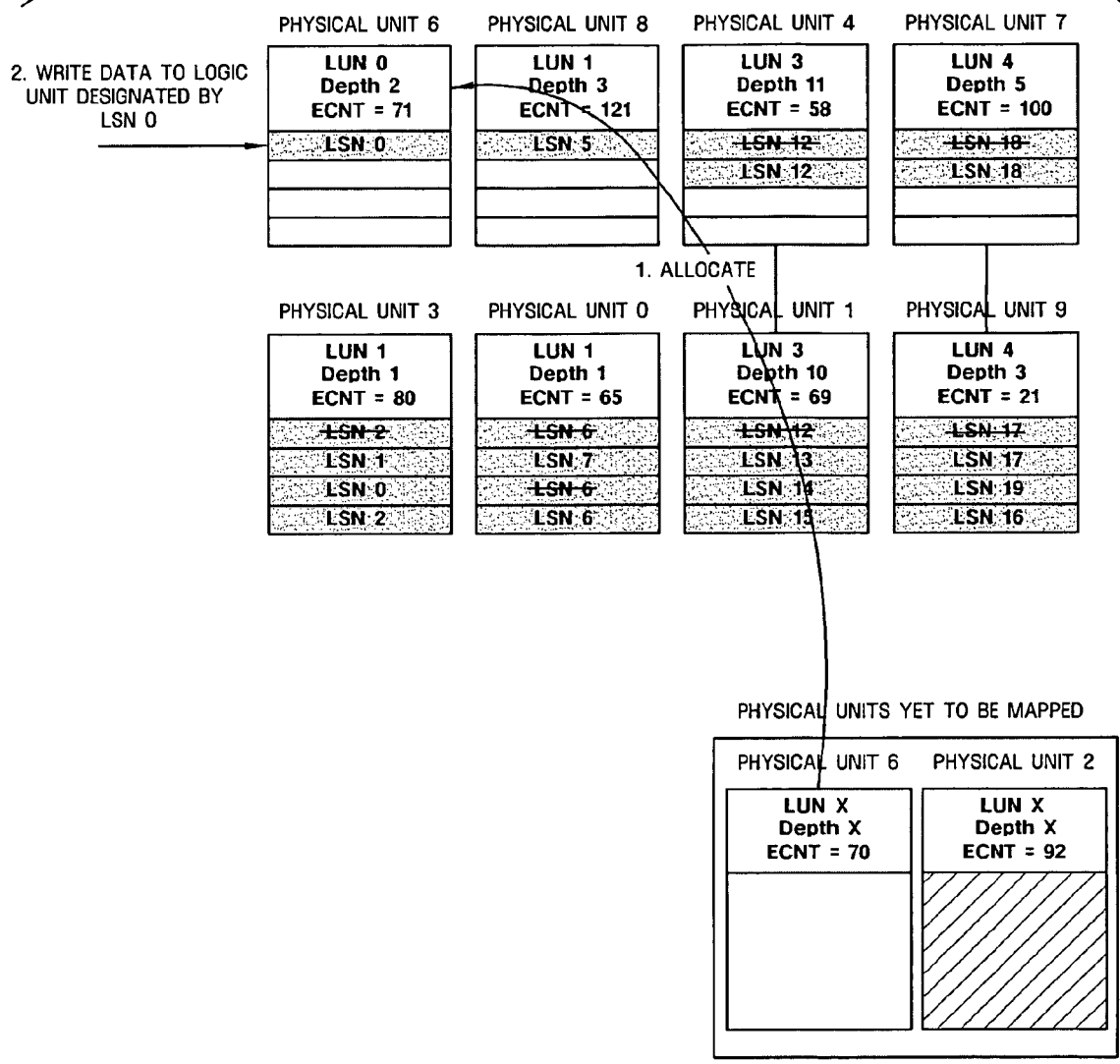

Accordingly, as shown in FIG. 23, physical units 6 and 2 are classified as physical units yet to be mapped. Since physical unit 6 has a lower erase count value than physical unit 2, physical unit 6 is newly mapped to logic unit 0.

Referring to back to FIG. 20, in operation S280, it is determined whether a difference between a maximum and a minimum of the erase count values of physical units is outside a predetermined range. In operation S290, if the difference between the maximum and the minimum of the erase count values of the physical units is outside the predetermined range, a wear leveling operation is forcefully performed.

Figure 24:
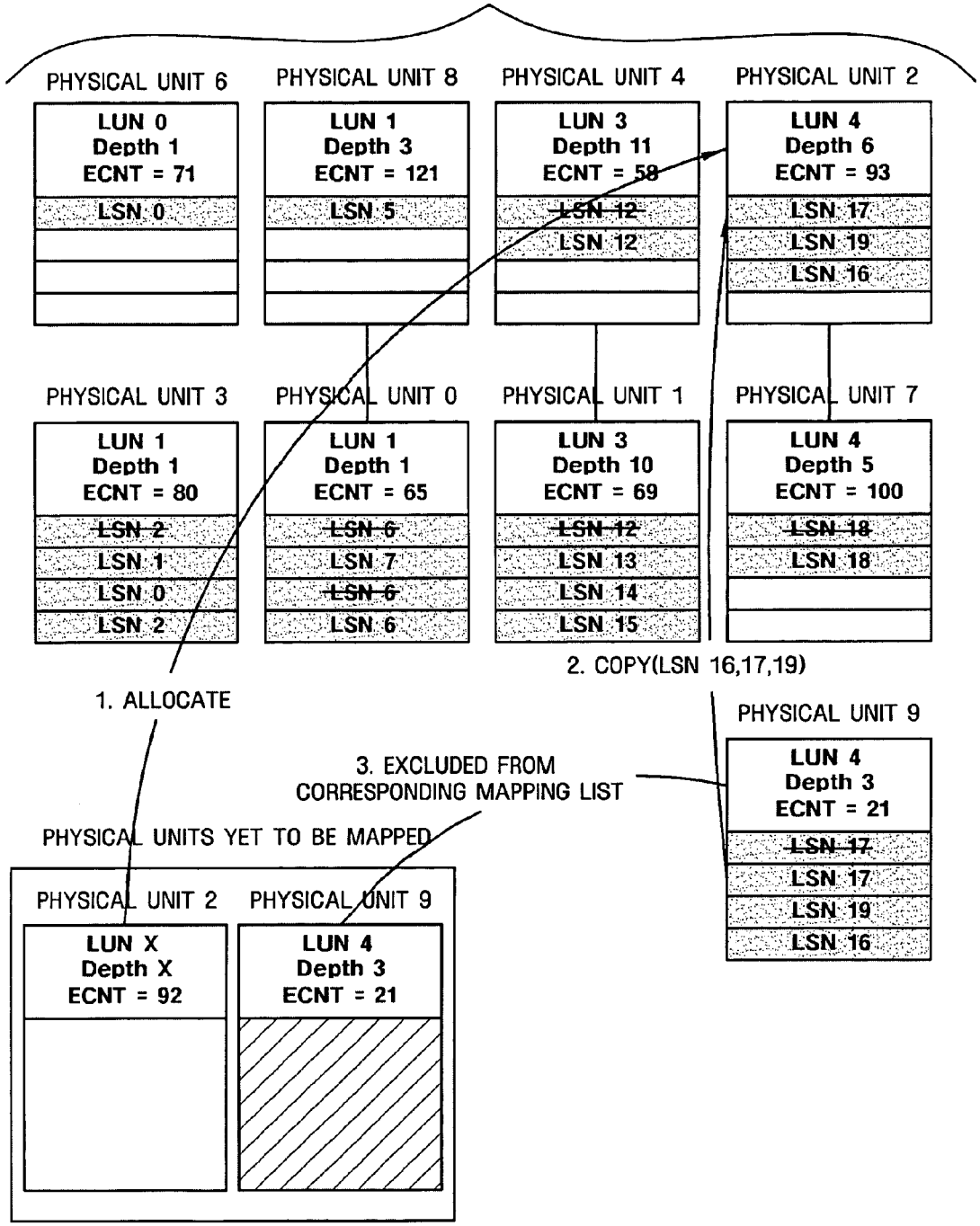

In other words, as shown in FIG. 24, a minimum and a maximum among the erase count values of physical units 1 through 9 are detected, and it is determined whether a difference there between is not smaller than a predetermined value.

Here, physical unit 8 has a maximum erase count value of 121, and physical unit 9 has a minimum erase count value of 21. Thus, a difference between the maximum and minimum erase count values is 100.

Thus, if the predetermined value is 100, physical unit 9 is forcefully excluded from the compaction operation.

While the method of re-mapping a flash memory according to the present invention has been described with reference to the exemplary embodiments and drawings, it is to be appreciated that the above described exemplary embodiments are for purposes of illustration only and not to be construed as a limitation of the invention, and all variations and equivalents which fall within the range of the claims are intended to be embraced therein.

The method of re-mapping a flash memory according to the present invention has the following advantages.

First, it is possible to evenly use physical units yet to be mapped by sequentially mapping the physical units to logic units according to their erase count values in such a manner that a physical unit having a smaller erase count value is mapped to a logic unit ahead of a physical unit having a larger erase count value. Thus, it is possible to increase the durability of a flash memory.

Second, it is possible to provide a quick response to a user's request by minimizing the number of times the flash memory is accessed in the process of writing data to the flash memory through a compaction operation.

What is claimed is:

1. A method of re-mapping a flash memory including a plurality of physical units, to evenly use the flash memory, the method comprising:

arranging a plurality of physical units yet to be mapped according to corresponding erase count values; and sequentially mapping the plurality of the physical units to a logic unit in a sequence of mapping in such a manner that a physical unit having a first erase count value is mapped to the logic unit ahead of a physical unit having a second erase count value, wherein the first erase count value is less than the second erase count value; and wherein a physical unit having a largest depth value, indicating that the physical unit is determined to have been most recently mapped, is excluded from a compaction operation.

2. The method of claim 1, wherein in the sequentially mapping of the plurality of the physical units to the logic unit, each of the plurality of the physical units have a corresponding depth value indicating the sequence of mapping the plurality of the physical units to the logic unit.

3. The method of claim 2, wherein a physical unit having a larger depth value is determined to have been more recently mapped to the logic unit.

4. The method of claim 3 further comprising:
generating empty physical units in the logic unit by performing a compaction operation if there are no physical units yet to be mapped.

5. The method of claim 4, wherein the generating of the empty physical units in the logic unit comprises:
selecting one of a plurality of physical units mapped to the logic unit that has a lowest compaction cost;
determining the lowest compaction cost of the selected physical unit as a compaction cost of the logic unit; and
copying at least one valid sector of the selected physical unit to an empty space of the logic unit and excluding the selected physical unit from a list of physical units mapped to the logic unit.

6. The method of claim 5, wherein the compaction cost of the selected physical unit is determined as a time required for copying the at least one valid sector of the selected physical unit based on a number of valid sectors of the selected physical unit and a cost of copying the valid sectors of the selected physical unit.

7. The method of claim 6, wherein if locations of logic sectors stored in the selected physical unit are fixed, the compaction cost of the selected physical unit is obtained using the following equation: $C=Sv*Cc+Se*We$, where C is the compaction cost of the selected physical unit, Sv is the number of valid sectors of the selected physical unit, Cc is the cost of copying the valid sectors of the selected physical unit, Se is a number of empty sectors of the logic unit, and We is a weight of each of the empty sectors.

8. The method of claim 6, wherein if locations of logic sectors stored in the physical unit are unfixed, the compaction cost of the selected physical unit is obtained using the following equation: $C=Sv*Cc$, where C is the compaction cost of the selected physical unit, Sv is the number of valid sectors of the selected physical unit, and Cc is the cost of copying the valid sectors of the selected physical unit.

9. The method of claim 7, wherein if the valid sectors of the selected physical unit cannot be copied to the empty space of the logic unit, a unit allocation cost, which is a cost of allocating an empty physical unit to the logic unit is added to the compaction cost of the logic unit.

10. The method of claim 9, wherein the unit allocation cost is set based on a time required for erasing a physical unit and the time required for writing metadata of the physical unit.

11. The method of claim 10, wherein if locations of logic sectors stored in the physical unit are unfixed, the compaction cost of the selected physical unit is obtained using the following equation: $C = Sv * Cc$, where C is the compaction cost of the physical unit, Sv is the number of valid sectors of the selected physical unit, and Cc is the cost of copying the valid sectors of the selected physical unit.

12. The method of claim 11, wherein a compaction cost of a physical unit that has a second lowest compaction cost is added to the compaction cost of the logic unit.

13. The method of claim 12, wherein the generating the empty physical units in the logic unit further comprises:
searching for physical units having the second lowest compaction cost if there are no empty storage spaces for copying valid sectors of the logic unit having the lowest compaction cost;
mapping a predetermined empty physical unit to the logic unit; and
copying at least one valid sector of the selected physical unit to the predetermined empty physical unit of the logic unit and excluding the selected physical unit from the list of physical units mapped to the logic unit.

14. The method of claim 12, further comprising:
determining a maximum of the erase count value and a minimum of the erase count values of physical units mapped to predetermined logic units; and
performing the compaction operation if the maximum and the minimum of the erase count values of the physical units are greater than a predetermined value.

15. The method of claim 12, wherein the performing of the compaction operation includes performing a compaction operation on a physical unit having the minimum of the erase count values.

16. The method of claim 8, wherein if the valid sectors of the selected physical unit cannot be copied to an empty space of the logic unit, a unit allocation cost, which is a cost of allocating an empty physical unit to the logic unit is added to a compaction cost of the logic unit.

17. The method of claim 16, wherein the unit allocation cost is set based on a time required for erasing a physical unit and the time required for writing metadata of the physical unit.

18. The method of claim 17, wherein a compaction cost of a physical unit that has a second lowest compaction cost is added to the compaction cost of the logic unit.

19. The method of claim 18, wherein the generating the empty physical units in the logic unit further comprises:
searching for physical units having second lowest compaction cost if there are no empty storage spaces for copying valid sectors of the logic unit having the lowest compaction cost;
mapping a predetermined empty physical unit to the logic unit; and
copying at least one valid sector of the selected physical unit to the predetermined empty physical unit of the logic unit and excluding the selected physical unit from the list of physical units mapped to the logic unit.

20. The method of claim 18, further comprising:
determining a maximum of the erase count values and a minimum of the erase count values of physical units mapped to predetermined logic units; and
performing the compaction operation if the maximum and the minimum of the erase count values of the physical units are greater than a predetermined value.

21. The method of claim 18, wherein the performing of the compaction operation includes performing a compaction operation on a physical unit having the minimum of the erase count values.

22. A method of re-mapping a flash memory including a plurality of physical units, to evenly use the flash memory, the method comprising:

arranging an unmapped plurality of physical units according to corresponding erase count values in an arrangement; and sequentially mapping an unmapped first physical unit of the unmapped plurality of the physical units and an unmapped second physical unit of the unmapped plurality of the physical units to a logic unit in accordance with the arrangement such that the unmapped first physical unit having a first erase count value is mapped to the logic unit before the unmapped second physical unit having a second erase count value is mapped to the logic unit, wherein the first erase count value is less than the second erase count value; and wherein a physical unit having a largest depth value, indicating that the physical unit is determined to have been most recently mapped, is excluded from a compaction operation.

23. The method of claim 22, wherein in the sequentially mapping, the mapped first physical unit and the mapped second physical unit have a first depth value and a second depth value, respectively, the first and the second depth values indicating which one of the mapped first and the mapped second physical units was most recently mapped to the logic unit.

24. The method of claim 1, wherein the compaction operation generates empty physical units in the logic unit.

25. The method of claim 1, wherein in the sequentially mapping of the plurality of the physical units to the logic unit, each of the plurality of the physical units have a corresponding depth value indicating the sequence of mapping the plurality of the physical units to the logic unit, and a physical unit that is determined to have been most recently mapped, is excluded from a compaction operation.

26. The method of claim 25, wherein the compaction operation generates empty physical units in the logic unit.

* * * * *